(12) United States Patent
Aisaka et al.

(10) Patent No.: US 8,577,137 B2
(45) Date of Patent: Nov. 5, 2013

(54) IMAGE PROCESSING APPARATUS AND METHOD, AND PROGRAM

(75) Inventors: Kazuki Aisaka, Kanagawa (JP); Masaya Kinoshita, Kanagawa (JP); Takashi Kameya, Kanagawa (JP); Jun Murayama, Tokyo (JP); Masatoshi Yokokawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/999,771

(22) PCT Filed: Apr. 30, 2010

(86) PCT No.: PCT/JP2010/057648
§ 371 (c)(1),
(2), (4) Date: Dec. 17, 2010

(87) PCT Pub. No.: WO2010/128646
PCT Pub. Date: Nov. 11, 2010

(65) Prior Publication Data
US 2012/0121173 A1      May 17, 2012

(30) Foreign Application Priority Data

May 8, 2009   (JP) ................................ P2009-113413

(51) Int. Cl.
*G06K 9/00* (2006.01)
(52) U.S. Cl.
USPC ............ 382/165; 382/190; 382/164; 382/173
(58) Field of Classification Search
None
See application file for complete search history.

(56) References Cited

U.S. PATENT DOCUMENTS 5,506,936 A * 4/1996 Hisano .............................. 706/4
6,005,978 A * 12/1999 Garakani ...................... 382/218

(Continued)

FOREIGN PATENT DOCUMENTS

| JP | 2000-149031 | 5/2000 |
| JP | 2008-210009 | 9/2008 |
| JP | 2010-55194  | 3/2010 |

OTHER PUBLICATIONS

International Search Report from the Japanese Patent Office in International Application No. PCT/JP2010/057648, mailed Jul. 6, 2010.

*Primary Examiner* — Sean Motsinger
(74) *Attorney, Agent, or Firm* — Finnegan, Henderson, Farabow, Garrett & Dunner, LLP

(57) ABSTRACT

The present invention relates to an image processing apparatus and method, and a program that are capable of more easily identifying an area of a subject in an image.
A luminance information extraction unit 21 through to a motion information extraction unit 25 extract predetermined information from an input image and create an information map indicating feature quantities of features possessed by an area of a subject of the input image.
Furthermore, the luminance information extraction unit 21 through to the motion information extraction unit 25 subtract an average value of the pixel values of the pixels of the entire information map from the pixel value of each pixel of the created information map so as to normalize the information map. As a result, the information map can be normalized, and noise can be removed with a simple process when compared to a case in which the information map is normalized using a DOG filter. A subject map creation unit 26 linearly combines each information map, and creates a subject map indicating the likelihood of an area being a subject in each area of an input image. The present invention can be applied to an image processing apparatus.

5 Claims, 12 Drawing Sheets

(56) References Cited

U.S. PATENT DOCUMENTS

| | | | |
|---|---|---|---|
| 6,674,915 B1* | 1/2004 | Wang | 382/263 |
| 6,785,427 B1* | 8/2004 | Zhou | 382/294 |
| 7,343,028 B2* | 3/2008 | Ioffe et al. | 382/118 |
| 7,426,312 B2* | 9/2008 | Dance et al. | 382/254 |
| 8,098,886 B2* | 1/2012 | Koch et al. | 382/103 |
| 2002/0110276 A1* | 8/2002 | Kasutani | 382/165 |
| 2002/0154833 A1* | 10/2002 | Koch et al. | 382/325 |
| 2003/0012282 A1* | 1/2003 | Chelladurai et al. | 375/240.16 |
| 2005/0047647 A1* | 3/2005 | Rutishauser et al. | 382/159 |
| 2005/0286767 A1* | 12/2005 | Hager et al. | 382/190 |
| 2006/0018543 A1* | 1/2006 | Michiishita | 382/181 |
| 2006/0238723 A1* | 10/2006 | El-Ghoroury | 353/94 |
| 2007/0242900 A1* | 10/2007 | Chen et al. | 382/294 |
| 2012/0106850 A1* | 5/2012 | Koch et al. | 382/195 |

* cited by examiner

- filter1=[−1, −2, −1, 2, 4, 2, −1, −2, −1]/16;
- filter2=[1, 3, 3, 1, 1, 3, 3, 1]/16;
- filter45=[ 0  1  2;
           −1  0  1;
           −2 −1  0]/8;
- filter135=[2  1  0;
             1  0 −1;
             0 −1 −2]/8;

- filter0=[ 1  2  1;
           0  0  0;
          −1 −2 −1]/8
- filter90=[1  0 −1;
            2  0 −2;
            1  0 −1]/8
- filter45=[ 0  1;
            −1  0]/2;
- filter135=[1  0 ;
             0 −1]/2

IMAGE PROCESSING APPARATUS AND METHOD, AND PROGRAM

TECHNICAL FIELD

The present invention relates to an image processing apparatus and method, and a program, and more particularly, to an image processing apparatus and method, and a program that are capable of more simply identifying an area of a subject in an image.

BACKGROUND ART

Hitherto, as a technology for identifying an area of a subject in an image, a technology called visual attention is known (see, for example, NPLs 1 and 2).

In visual attention, luminance information, color information, and edge information are extracted from an input image that is input. On the basis of those extracted information items, an information map indicating the likelihood of an area being the subject in each area of the input image is created for each item of the extracted information.

Then, information obtained as a result of a filtering process using a DOG filter, or obtained in such a manner that the respective information maps are normalized by linear normalization and are added up, and thereafter are further normalized, is formed as a subject map. This subject map is information indicating the likelihood of the area being the subject in each area of the input image. Use of a subject map makes it possible to identify which area of the input image the subject is contained.

Here, as luminance information, an average value of R (red), G (green), and B (blue) components of the pixels of an input image is extracted from the input image, and as color information, a difference of the R and G components of the pixels of the input image, and a difference of the B and Y (yellow) components are extracted. Furthermore, edge strengths of each of the directions of 0 degrees, 45 degrees, 90 degrees, and 135 degrees are extracted from the input image by using a Gabor filter.

CITATION LIST

Non-Patent Literature

NPL 1: Laurent Itti Christof Koch and Ernst Niebur "A Model of Saliency-Based Visual Attention for Rapid Scene Analysis"
NPL 2: Laurent Itti Christof Koch "Feature combination strategies for saliency-based visual attention systems"

SUMMARY OF INVENTION

Technical Problem

However, in the above-mentioned technology, the number of processes is large, and time is taken to create a subject map. For example, since a filtering process using a Gabor filter needs exponential computations, the number of processes is large. Furthermore, since a DOG filter has many taps, the number of filtering processes using a DOG filter increases.

Meanwhile, in a case where normalization of an information map is to be performed by linear normalization, it is possible to suppress the number of processes for normalization. However, removing noise from an information map during normalization is difficult, and the accuracy of detecting a subject using a subject map is decreased. That is, there is a case of erroneously detecting that a noise area is an area of the subject.

Furthermore, if a process for obtaining a subject map is to be performed using hardware, the circuit scale becomes larger due to influences of exponential computations of a Gabor filter and the number of taps of a DOG filter.

The present invention has been made in view of these circumstances, and aims to be capable of more easily and quickly obtaining information for identifying an area of a subject in an image.

Solution to Problem

An image processing apparatus according to an aspect of the present invention includes extracted information image generation means for generating a plurality of extracted information images having mutually different resolutions on the basis of the extracted information images made up of predetermined information extracted from respective areas of an input image; difference image generation means for generating a difference image by obtaining a difference between two predetermined extracted information images among the plurality of the extracted information images; information map creation means for creating an information map indicating feature quantities of features possessed by an area of a subject in the input image by performing weight addition of the plurality of difference images; normalization means for normalizing the information map by subtracting an average value of values of the respective areas of the information map from the value of each area of the information map; and subject map creation means for creating a subject map indicating the likelihood of an area being a subject in each area of the input image by performing weight addition of the plurality of normalized information maps.

The image processing apparatus can further include edge image generation means for generating, as the extracted information images, images representing edge strengths of the respective areas of the input image by performing weight addition of pixel values of several pixels of the input image by using a pre-specified coefficient.

The extracted information image generation means can generate the plurality of extracted information images having mutually different resolutions by setting an average value of pixel values of pixels that are adjacent to each other in the extracted information image as a pixel value of a pixel of another extracted information image differing from the extracted information image.

An image processing method or a program according to an aspect of the present invention includes the steps of: generating a plurality of extracted information images having mutually different resolutions on the basis of extracted information images made up of predetermined information extracted from respective areas of an input image; generating a difference image by obtaining a difference between two predetermined extracted information images among the plurality of the extracted information images; creating an information map indicating feature quantities of features possessed by a subject in the input image by performing weight addition of the plurality of difference images; normalizing the information map by subtracting an average value of values of the respective areas of the information map from the value of each area of the information map; and creating a subject map indicating the likelihood of an area being a subject for each area of the input image by performing weight addition of the plurality of normalized information maps.

In an aspect of the present invention, on the basis of extracted information images made up of predetermined information extracted from the respective areas of an input image, the plurality of extracted information images having mutually different resolutions are generated. A difference image is generated by obtaining a difference between two predetermined extracted information images among the plurality of the extracted information images. An information map indicating feature quantities of features possessed by an area of a subject in the input image is generated by performing weight addition of the plurality of difference images. The information map is normalized by subtracting an average value of values of the respective areas of the information map from the value of each area of the information map. A subject map indicating the likelihood of an area being a subject in each area of the input image is generated by performing weight addition of the plurality of normalized information maps.

Advantageous Effects of Invention

According to an aspect of the present invention, it is possible to more easily and quickly obtain information for identifying an area of a subject in an image.

DESCRIPTION OF EMBODIMENTS

With reference to the drawings, embodiments to which the present invention is applied will be described below.

[Configuration of Image Processing Apparatus]

Figure 1:
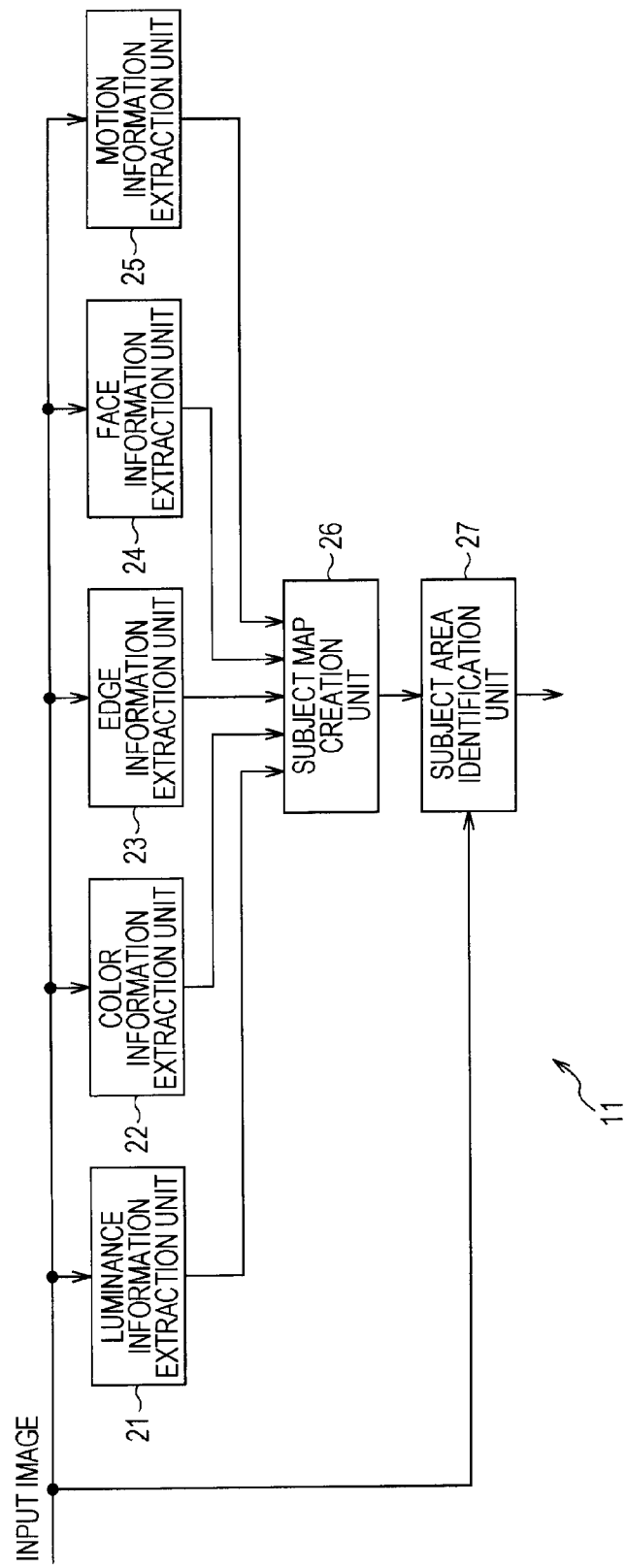
FIG. 1 illustrates an example of the configuration of an embodiment of an image processing apparatus to which the present invention is applied.

FIG. 1 illustrates an example of the configuration of an embodiment of an image processing apparatus to which the present invention is applied.

An image processing apparatus 11 is constituted by a luminance information extraction unit 21, a color information extraction unit 22, an edge information extraction unit 23, a face information extraction unit 24, a motion information extraction unit 25, a subject map creation unit 26, and a subject area identification unit 27.

For example, the image processing apparatus 11 includes an image-capturing device for capturing an input image containing a subject. An input image obtained by image capturing is supplied to the luminance information extraction unit 21 through to the motion information extraction unit 25, and the subject area identification unit 27. This input image is a video signal composed of Y (luminance) components, Cr (color difference) components, and Cb (color difference) components.

The luminance information extraction unit 21 through to the motion information extraction unit 25 extract predetermined information from the supplied input image, and create, on the basis of an extracted information image composed of the extracted information, an information map indicating the likelihood of an area being a subject for each area of the input image. The information contained in these information maps is information indicating the feature quantities of the features that are contained to a greater degree in the area in which the subject is contained, and the information that is arranged in such a manner as to correspond to each area of the input image is made to be an information map. That is, the information map may be said to be information indicating the feature quantities in each area of the input image.

Here, in a case where a user casts a quick glance at an input image, the term "subject" refers to an object body in the input image, which the user is estimated to pay notice to, that is, an object body, which the user is estimated to turn his/her attention to. Therefore, the subject is not necessarily limited to a person. Furthermore, in the luminance information extraction unit 21 through to the motion information extraction unit 25, as information maps, a luminance information map, a color information map, an edge information map, a face information map, and a motion information map are created.

More specifically, the luminance information extraction unit 21 creates a luminance information map by using, as an extracted information image, a luminance image composed of Y (luminance) components of the supplied input image, and supplies the luminance information map to the subject map creation unit 26. The color information extraction unit 22 creates a color information map by using, as extracted information images, a Cr image composed of Cr components of the supplied input image and a Cb image composed of Cb components thereof, and supplies the color information map to the subject map creation unit 26.

The edge information extraction unit 23 creates an edge information map by using, as an extracted information image, an edge image composed of an edge strength of each area of the supplied input image, and supplies the edge information map to the subject map creation unit 26. The face information extraction unit 24 creates a face information map by using, as an extracted information image, an image composed of information about the face of a person as a subject in each area of the supplied input image, and supplies the face information map to the subject map creation unit 26. The motion information extraction unit 25 creates a motion information map by using, as an extracted information image, an image composed of information about the motion in each area of the supplied input image, and supplies the motion information map to the subject map creation unit 26.

The subject map creation unit 26 creates a subject map by adding up information maps supplied from the luminance information extraction unit 21 through to the motion information extraction unit 25, and supplies the subject map to the subject area identification unit 27. This subject map is information for identifying an area in which the subject in the input image is contained.

The subject area identification unit 27 identifies the area of the subject in the supplied input image by using the subject map from the subject map creation unit 26, and outputs the identification result.

[Configuration of Luminance Information Extraction Unit]

Next, a more detailed configuration of the luminance information extraction unit 21 through to the motion information extraction unit 25 of FIG. 1 will be described.

Figure 2:
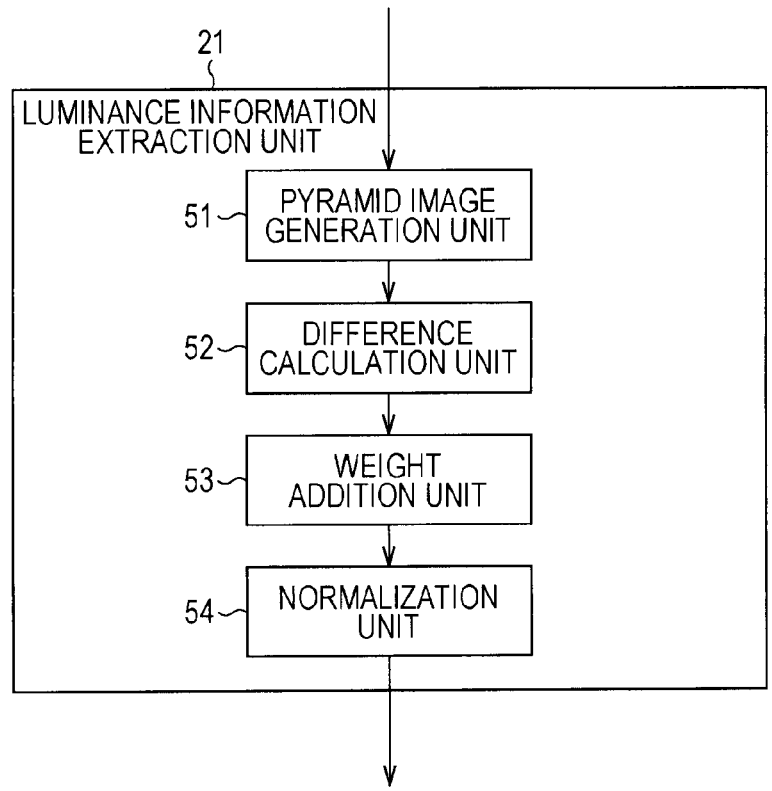
FIG. 2 illustrates an example of the configuration of a luminance information extraction unit.

FIG. 2 is a block diagram illustrating an example of the configuration of a luminance information extraction unit 21.

The luminance information extraction unit 21 is constituted by a pyramid image generation unit 51, a difference calculation unit 52, a weight addition unit 53, and a normalization unit 54.

The pyramid image generation unit 51 sets, as a luminance image, an image composed of the Y components of the supplied input image, and creates a plurality of luminance images having mutually different resolutions by using the luminance images, and supplies those luminance images, as pyramid images of luminance, to the difference calculation unit 52. Here, the pixel value of the pixel of the luminance image generated from the input image is the value of the Y component of the pixel of the input image at the same position as that of the pixel of the luminance image.

Figure 3:
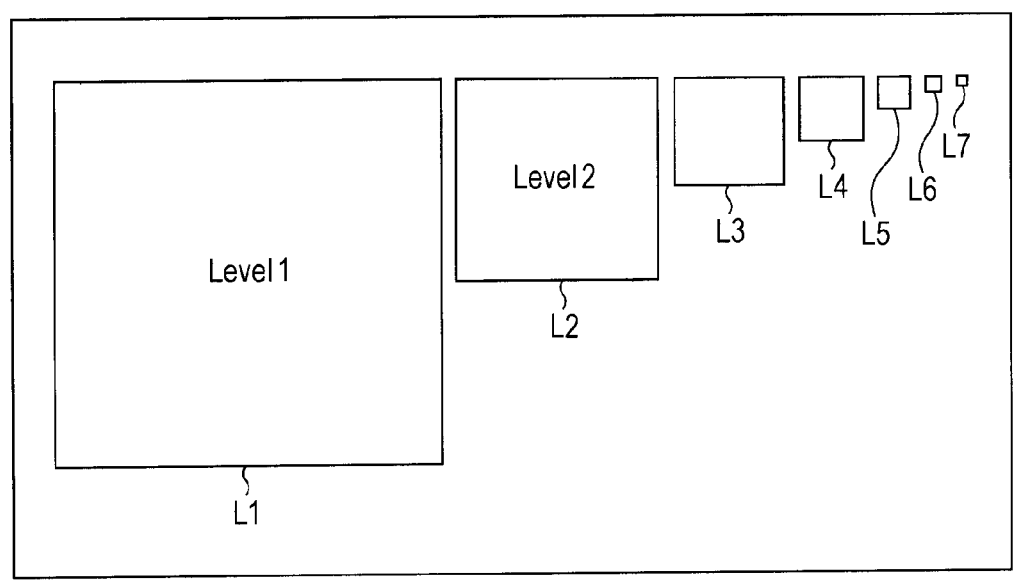
FIG. 3 illustrates a pyramid image.

Furthermore, for example, as shown in FIG. 3, seven pyramid images L1 to L7 of seven resolutions from the level L1 to the level L7 are generated. Meanwhile, the pyramid image L1 of the level L1 has the highest resolution, and the resolutions of the pyramid images are set so as to be decreased in the order from the level L1 to the level L7. In this case, the luminance image of the same resolution (the number of pixels) thereof as the input image composed of the Y components of the input image is set as the pyramid image L1 of the level L1.

Figure 4:
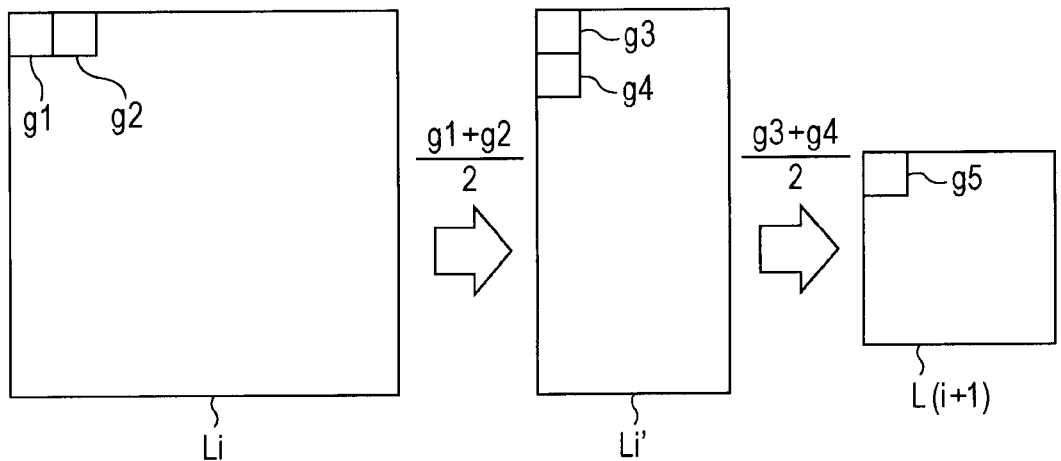
FIG. 4 illustrates the generation of a pyramid image.

Furthermore, as shown in FIG. 4, by obtaining the average value of the pixel values of the pixels mutually adjacent to the pyramid image Li of the level Li (where $1 \leq i \leq 6$), the pyramid image L (i+1) of the level L (i+1) is generated.

That is, the pyramid image Li is down-converted so that it will have a half number of pixels in the horizontal direction in the figure, and the thus obtained image is set as an image Li'. For example, the average value of the pixel values of the mutually adjacent pixels g1 and g2 in the horizontal direction of the pyramid image Li is set as the pixel value of the pixel g3 of the image Li'.

Then, furthermore, the image Li' is down-converted so that it will have a half number of pixels in the vertical direction in the figure, and the thus obtained image is set as a pyramid image L (i+1) of the level L (i+1). For example, the average value of the pixel values of the mutually adjacent pixels g3 and g4 in the vertical direction of the image Li' is set as the pixel value of the pixel g5 of the pyramid image L (i+1).

Referring back to the description of the luminance information extraction unit 21 of FIG. 2, the difference calculation unit 52 selects two pyramid images of mutually different hierarchies from among the pyramid images of each hierarchy supplied from the pyramid image generation unit 51, obtains the difference of the selected pyramid images, and generates a difference image of luminance.

Meanwhile, since the pyramid images of each hierarchy have different sizes (the number of pixels), when the difference image is to be generated, the smaller pyramid image is up-converted in accordance with the larger pyramid image.

When a pre-specified number of difference images of luminance are generated, the difference calculation unit 52 supplies those generated difference images to the weight addition unit 53.

The weight addition unit 53 creates a luminance information map by performing weight addition of the difference images supplied from the difference calculation unit 52, and supplies the luminance information map to the normalization unit 54. The normalization unit 54 normalizes the luminance information map from the weight addition unit 53 and supplies it to the subject map creation unit 26.

[Configuration of Color Information Extraction Unit]

Figure 5:
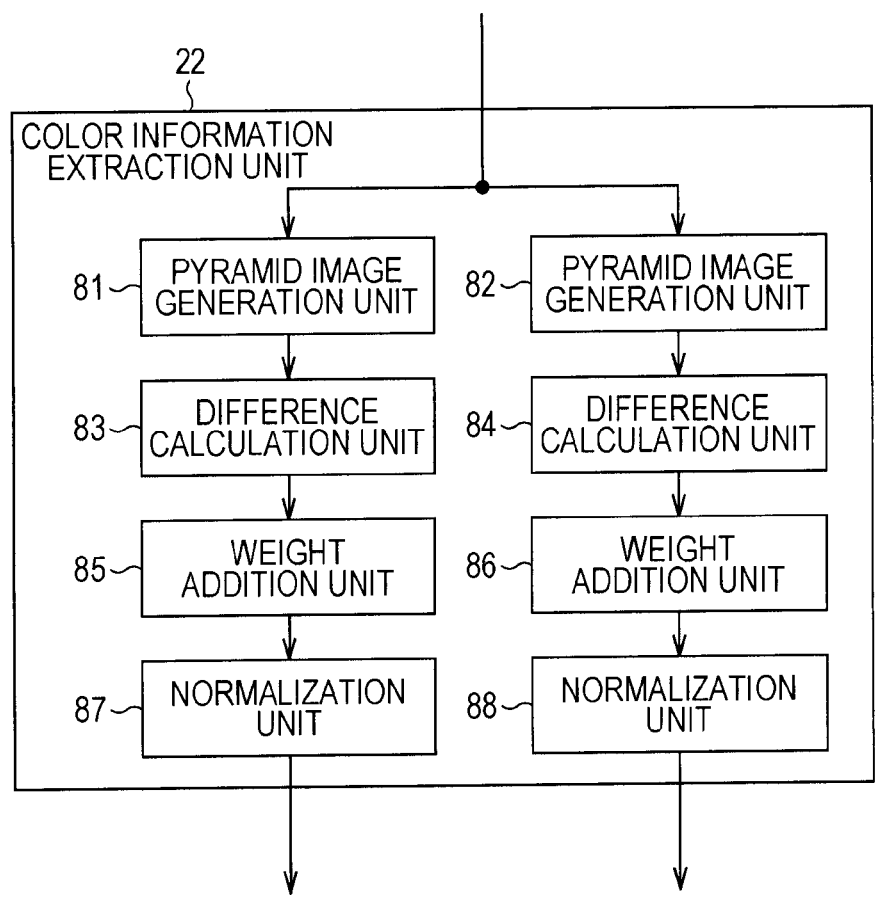
FIG. 5 illustrates an example of the configuration of a color information extraction unit.

FIG. 5 is a block diagram illustrating an example of the configuration of the color information extraction unit 22.

The color information extraction unit 22 is constituted by a pyramid image generation unit 81, a pyramid image generation unit 82, a difference calculation unit 83, a difference calculation unit 84, a weight addition unit 85, a weight addition unit 86, a normalization unit 87, and a normalization unit 88.

The pyramid image generation unit 81 sets, as a Cr image, an image composed of Cr components of the supplied input image. The pyramid image generation unit 82 sets, as a Cb image, an image composed of Cb components of the supplied input image. Here, the pixel value of the pixel of the Cr image and the Cb image are respectively set as the value of the Cr components and the Cb components of the pixel of the input image at the same position as that of the pixel of the Cr image and the Cb image.

The pyramid image generation unit 81 and the pyramid image generation unit 82 generate a plurality of Cr images and Cb images having mutually different resolutions by using the Cr image and the Cb image. Then, the pyramid image generation unit 81 and the pyramid image generation unit 82 supply those generated Cr image and Cb image as a pyramid image of Cr and a pyramid image of Cb to the difference calculation unit 83 and the difference calculation unit 84.

For example, as pyramid images of Cr and pyramid images of Cb, similarly to the case of the pyramid images of luminance, pyramid images of a hierarchy of seven resolutions from the level L1 to the level L7 are generated correspondingly.

The difference calculation unit 83 and the difference calculation unit 84 select two pyramid images of mutually different hierarchies from among a plurality of pyramid images from the pyramid image generation unit 81 and the pyramid image generation unit 82, obtain a difference between the selected pyramid images, and generate a difference image of Cr and a difference image of Cb.

Meanwhile, since the pyramid images of each hierarchy have mutually different sizes, when a difference image is to be generated, a smaller pyramid image is up-converted so as to have the same size as that of the larger pyramid image.

When the difference calculation unit 83 and the difference calculation unit 84 generate a pre-specified number of difference images of Cr and a pre-specified number difference images of Cb, they supply those generated difference images to the weight addition unit 85 and the weight addition unit 86.

The weight addition unit 85 and the weight addition unit 86 perform weight addition of the difference images supplied from the difference calculation unit 83 and the difference calculation unit 84, create a color information map of Cr and a color information map of Cb, and supply them to the normalization unit 87 and the normalization unit 8, respectively. The normalization unit 87 and the normalization unit 88 normalize the color information maps from the weight addition unit 85 and the weight addition unit 86, respectively, and supply them to the subject map creation unit 26.

[Configuration of Edge Information Extraction Unit]

Figure 6:
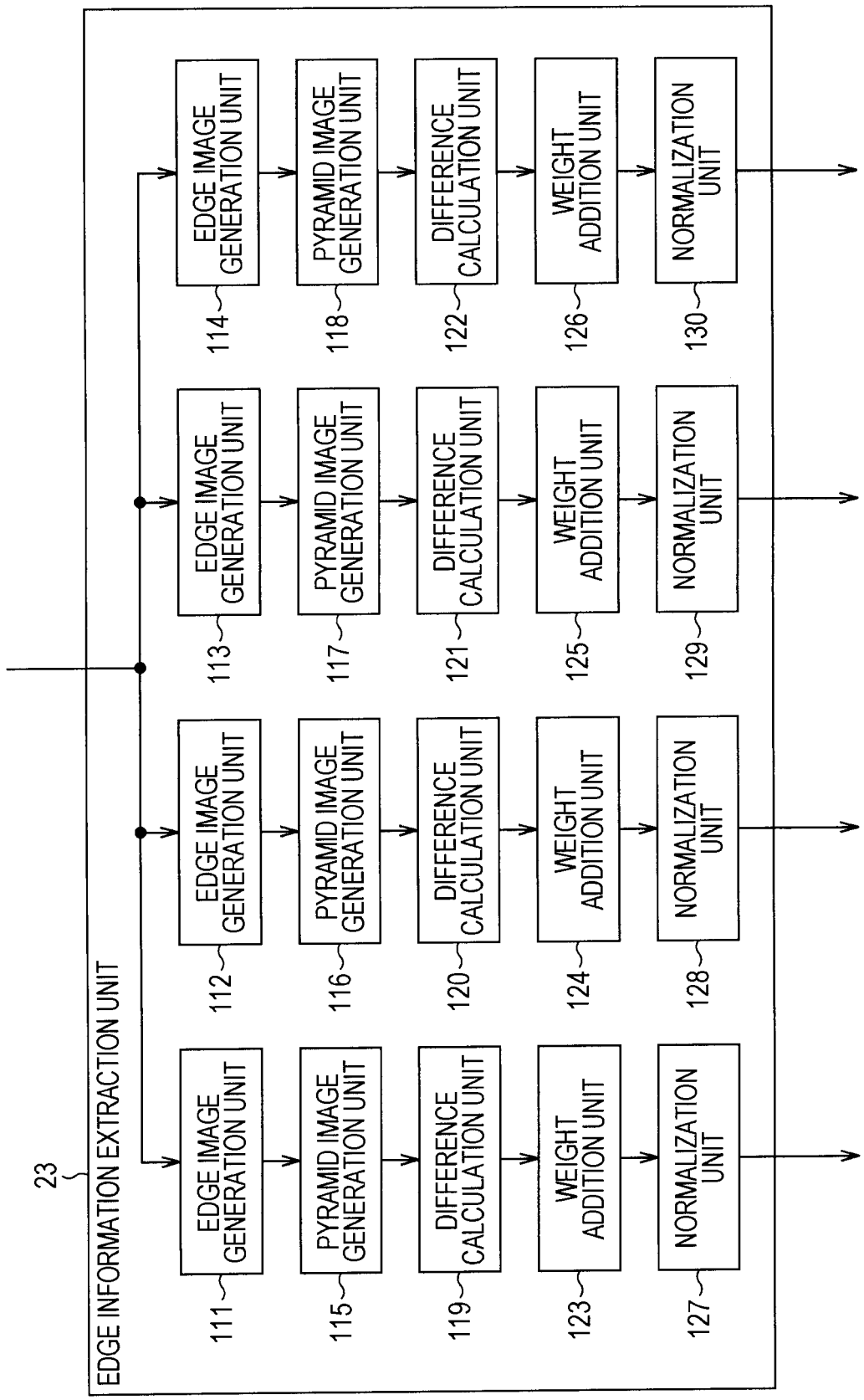
FIG. 6 illustrates an example of the configuration of an edge information extraction unit.

FIG. 6 is a block diagram illustrating an example of the configuration of the edge information extraction unit 23.

The edge information extraction unit 23 is constituted by an edge image generation unit 111 through to an edge image generation unit 114, a pyramid image generation unit 115 through to a pyramid image generation unit 118, a difference calculation unit 119 through to a difference calculation unit 122, a weight addition unit 123 through to a weight addition unit 126, and a normalization unit 127 through to a normalization unit 130.

The edge image generation unit 111 through to the edge image generation unit 114 perform a filtering process on the supplied input image so as to generate, as extracted information images, edge images in which, for example, edge strengths in the directions of 0 degrees, 45 degrees, 90 degrees, and 135 degrees are pixel values of the pixels.

For example, the pixel value of the pixel of the edge image generated by the edge image generation unit 111 indicates the edge strength in the direction of 0 degrees in the pixel of the input image at the same position as that of the pixel of the edge image. Meanwhile, the direction of each edge refers to a direction that is determined by using a predetermined direction in the input image as a reference.

The edge image generation unit 111 through to the edge image generation unit 114 supply the generated edge image to the pyramid image generation unit 115 through to the pyramid image generation unit 118, respectively.

The pyramid image generation unit 115 through to the pyramid image generation unit 118 generate a plurality of edge images having mutually different resolutions by using the edge images supplied from the edge image generation unit 111 through to the edge image generation unit 114, respectively. Then, the pyramid image generation unit 115 through to the pyramid image generation unit 118 supply those generated edge images in each direction, as pyramid images in each direction of an edge, to the difference calculation unit 119 through to the difference calculation unit 122, respectively.

For example, as pyramid images in each direction of the edge, similarly to the case of the pyramid image of luminance, pyramid images are generated, each of which has seven hierarchies from the level L1 to the level L7.

The difference calculation unit 119 through to the difference calculation unit 122 select two pyramid images of mutually different hierarchies from among a plurality of pyramid images from the pyramid image generation unit 115 through to the pyramid image generation unit 118, respectively, obtain a difference of the selected pyramid images, and generate a difference image in each direction of the edge.

Meanwhile, the pyramid images of each hierarchy has mutually different sizes. Thus, when a difference image is to be generated, the smaller pyramid image is up-converted so as to have the same size as that of the larger pyramid image.

When a pre-specified number of difference images in each direction of the edge are generated, the difference calculation unit 119 through to the difference calculation unit 122 supply those generated difference images to the weight addition unit 123 through to the weight addition unit 126, respectively.

The weight addition unit 123 through to the weight addition unit 126 perform weight addition of the difference images supplied from the difference calculation unit 119 through to the difference calculation unit 122, respectively, create edge information maps in each direction, and supply them to the normalization unit 127 through to the normalization unit 130, respectively. The normalization unit 127 through to the normalization unit 130 normalize the edge information maps from the weight addition unit 123 through to the weight addition unit 126, respectively, and supply them to the subject map creation unit 26.

[Configuration of Face Information Extraction Unit]

Figure 7:
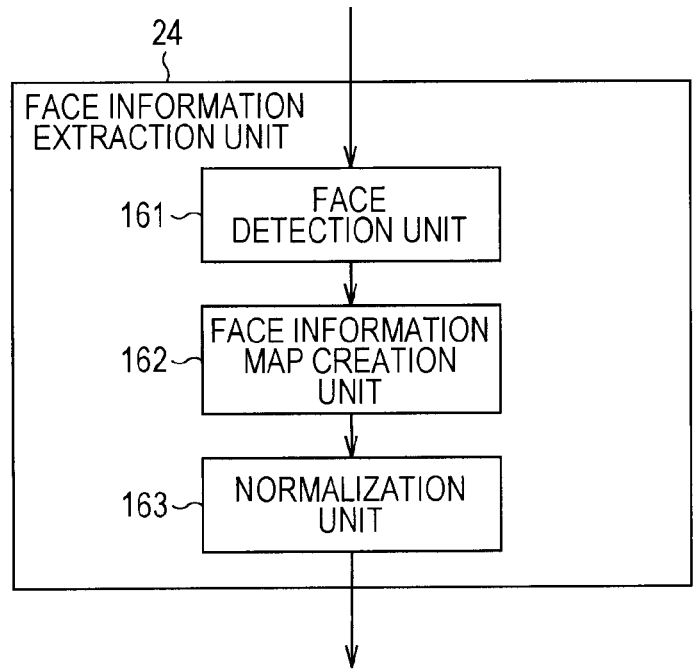
FIG. 7 illustrates an example of the configuration of a face information extraction unit.

FIG. 7 is a block diagram illustrating an example of the configuration of the face information extraction unit 24.

The face information extraction unit 24 is constituted by a face detection unit 161, a face information map creation unit 162, and a normalization unit 163.

The face detection unit 161 detects the area of the face of a person as a subject from the supplied input image, and supplies the detection result as extracted information image to the face information map creation unit 162. The face information map creation unit 162 creates a face information map on the basis of the detection result from the face detection unit 161, and supplies the face information map to the normalization unit 163. The normalization unit 163 normalizes the face information map supplied from the face information map creation unit 162, and supplies the face information map to the subject map creation unit 26.

[Configuration of Motion Information Extraction Unit]

Figure 8:
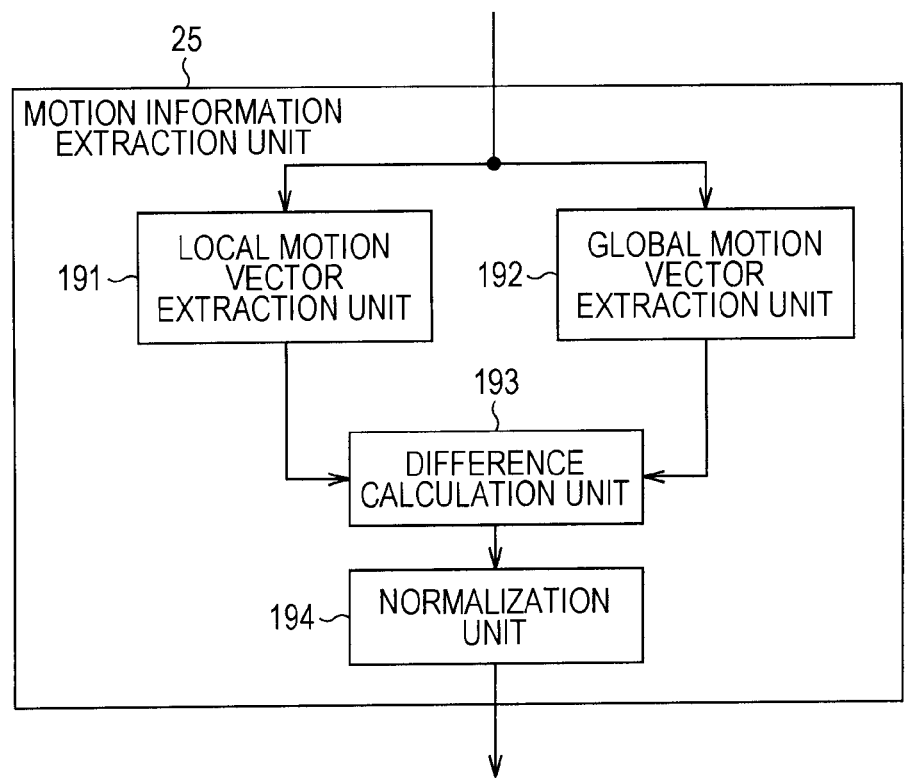
FIG. 8 illustrates an example of the configuration of a motion information extraction unit.

FIG. 8 is a block diagram illustrating an example of the configuration of the motion information extraction unit 25.

The motion information extraction unit 25 is constituted by a local motion vector extraction unit 191, a global motion vector extraction unit 192, a difference calculation unit 193, and a normalization unit 194.

By using the supplied input image and another input image whose image-capturing time differs from that of the input image, the local motion vector extraction unit 191 detects the motion vector of each pixel of the input image as a local motion vector, and supplies the motion vector to the difference calculation unit 193.

By using the supplied input image and the other input image whose image-capturing time differs from that of the input image, the global motion vector extraction unit 192 detects a global motion vector, and supplies it to the difference calculation unit 193. This global motion vector indicates the direction of the motion of the entire input image and is, for example, an average value of the motion vectors of the pixels of the input image.

The difference calculation unit 193 obtains the absolute value of the difference between the local motion vector from the local motion vector extraction unit 191 and the global motion vector from the global motion vector extraction unit 192 so as to generate a difference image of the motions, and supplies it to the normalization unit 194.

Here, the pixel value of the pixel in the difference image of the motion is the absolute value of the difference between the local motion vector of the pixel of the input image at the same position as that of the pixel in the difference image of the motion and the global motion vector of the entire input image. Therefore, the pixel value of the pixel of the difference image of the motion indicates the amount of motion with respect to the entire input image of the object body (or the background) displayed in the pixels of the input image, that is, relative to the background.

The normalization unit 194 creates a motion information map by normalizing the difference image of the motion from the difference calculation unit 193, and supplies the motion information map to the subject map creation unit 26. Meanwhile, in more detail, the creation of the motion information map is performed in a case where as input images, those that have been captured continuously with respect to time, for example, those in which input images have been captured continuously, or moving images, are supplied.

[Description of Subject Area Identification Process]

By the way, when an input image is supplied to the image processing apparatus 11, the image processing apparatus 11 starts a subject area identification process, identifies the area of the subject in the input image, and outputs the identification result. A description will be given below, with reference to the flowchart of FIG. 9, of a subject area identification process.

In step S11, the luminance information extraction unit 21 performs a luminance information extraction process so as to create a luminance information map on the basis of the supplied input image, and supplies the luminance information map to the subject map creation unit 26. Then, in step S12, the color information extraction unit 22 performs a color information extraction process so as to create a color information map on the basis of the supplied input image, and supplies the color information map to the subject map creation unit 26.

In step S13, the edge information extraction unit 23 performs an edge information extraction process so as to create an edge information map on the basis of the supplied input image, and supplies the edge information map to the subject map creation unit 26. Furthermore, in step S14, the face information extraction unit 24 performs a face information extraction process so as to create a face information map on the basis of the supplied input image, and supplies the face information map to the subject map creation unit 26. Furthermore, in step S15, the motion information extraction unit 25 performs a motion information extraction process so as to create a motion information map on the basis of the supplied input image, and supplies the motion information map to the subject map creation unit 26.

Meanwhile, the details of the luminance information extraction process, the color information extraction process, the edge information extraction process, the face information extraction process, and the motion information extraction process will be described later. Furthermore, in more detail, the motion information extraction process is not performed in a case where input images that have been captured continuously with respect to time are not supplied to the motion information extraction unit 25.

In step S16, the subject map creation unit 26 performs weight addition of the luminance information map through to the motion information map supplied from the luminance information extraction unit 21 through to the motion information extraction unit 25 so as to create a subject map, and supplies it to the subject area identification unit 27.

For example, the subject map creation unit 26 performs linear combination of each information map by using an information weight Wb, which is a weight obtained in advance for each information map. That is, when a predetermined pixel of the information map obtained by the linear combination is set as a pixel of interest, the pixel value of the pixel of interest is the sum total of the values obtained by multiplying the pixel value of the pixel of each information map at the same position as that of the pixel of interest by an information weight Wb for each information map.

Next, the subject map creation unit 26 performs a computation process using a sigmoid function on the pixel value of each pixel of the information map (hereinafter also referred to as a linearly combined information map) obtained by linear combination.

In more detail, the subject map creation unit 26 holds in advance a conversion table obtained by forming sigmoid functions as a table. This conversion table is formed of predetermined values as inputs, and output values obtained by substituting the values for the sigmoid function. If the linearly combined information map is converted using a conversion table, an information map similar to a case in which a linearly combined information map is converted using a sigmoid function is obtained.

For example, the sigmoid function is a hyperbolic cosine function (hyperbolic tangent function) shown in the following Expression (1).

$$f(x) = a \times \tan h(x \times b) \qquad (1)$$

Meanwhile, in Expression (1), a and b each denote a prespecified constant, and x denotes the pixel value of the pixel of the linearly combined information map to be converted from now.

In a case where such a hyperbolic cosine function is a sigmoid function, the conversion table is made to be a table that is obtained by limiting the range of the input value x from −2 to 2 and by discretizing the input value x in $1/128$ units. In such a conversion table, when the input value x is smaller than −2, the input value x is handled as −2, and when the input value x is greater than 2, the input value x is handled as 2. Furthermore, in the conversion table, the greater the input value x, the greater the output value f(x).

The subject map creation unit 26 converts the linearly combined information map by changing the pixel value of the pixel of the linearly combined information map from the pixel value x (input value x) to an output value f(x) corresponding to the pixel value x. That is, the subject map creation unit 26 sets the linearly combined information map converted by using a conversion table as a linearly combined information map in which a computation process using a sigmoid function has been performed.

As described above, by converting the linearly combined information map by using a conversion table, it is possible to convert a linearly combined information map more easily and quickly when compared to the case in which conversion is performed by using a sigmoid function itself.

Furthermore, the subject map creation unit 26 multiplies the pixel value of each pixel of the linearly combined information map converted using a conversion table by a subject weight Wc, which is a weight obtained in advance for each pixel, so as to form a subject map.

That is, when the pixel to which notice is paid in the subject map to be obtained is set as a pixel of interest, a value obtained by multiplying the pixel value of the pixel at the same position as that of the pixel of interest of the converted linearly combined information map by the subject weight Wc is set as the pixel value of the pixel of interest.

Meanwhile, in more detail, as color information maps used for creating subject maps, a color information map of Cr and a color information map of Cb are used, and as edge information maps, edge information maps in the direction of each of 0 degrees, 45 degrees, 90 degrees, and 135 degrees are used. Furthermore, the information weight Wb and the subject weight Wc have been obtained in advance by learning.

When the subject map is created in the manner described above, the subject map is supplied from the subject map creation unit 26 to the subject area identification unit 27, and the process then proceeds to step S17.

In step S17, the subject area identification unit 27 identifies the area of the subject in the supplied input image by using the subject map supplied from the subject map creation unit 26.

For example, the greater the pixel value of a pixel in the subject map, the more the area of the pixel in the input image at the same position as that of the pixel is assumed to be likely to be the area of the subject. In this case, the subject area identification unit 27 detects an area that has a pixel value greater than or equal to a pre-specified threshold value in the subject map, that is composed of mutually adjacent pixels, and that has a predetermined area (number of pixels) or greater, and the area in the input image corresponding to the detected area is an area in which the subject is contained.

When the subject area identification unit 27 detects the area of the input image in which the subject is contained, the subject area identification unit 27 outputs the detection result to a subsequent stage, and the subject area identification process is completed.

The detection result of the area of the subject obtained in the manner described above is used for various processes, such as a predetermined image processing being performed in the area of the subject of the input image. Furthermore, the identification result of the area of the subject may be used for image processing in which the area of the subject of the input image is displayed in the center of a screen when, for example, the input image is displayed as a slideshow.

Meanwhile, the subject area identification unit 27 may perform a predetermined process on an input image by using the detection result of the area of the subject and output the image.

As described above, the image processing apparatus 11 creates a subject map from the input image, and identifies the area of the subject in the input image by using a subject map.

[Description of Luminance Information Extraction Process]

Next, a description will be given of processes corresponding to the respective processes of steps S11 to S15 of FIG. 9.

First, a description will be given below, with reference to the flowchart of FIG. 10, of a luminance information extraction process corresponding to the process of step S11 of FIG. 9.

In step S41, on the basis of the luminance image composed of the Y (luminance) components of the supplied input image, the pyramid image generation unit 51 generates pyramid images of each hierarchy from the level L1 to the level L7, and supplies them to the difference calculation unit 52.

In visual attention of the related art, pyramid images of eight hierarchies have been generated. In the image processing apparatus 11, since pyramid images of seven hierarchies are generated, the number of pyramid images generated is reduced by one. Therefore, it is possible to more easily and quickly obtain a luminance information map than in the related art.

Meanwhile, even if the number of hierarchies of pyramid images is set to seven, it has been confirmed by the applicant that there is no influence on the identification accuracy of the area of the subject using the subject map. According to the image processing apparatus 11, it is possible to more quickly obtain a subject map without decreasing the identification accuracy of the area of the subject.

Furthermore, in the visual attention of the related art, luminance images have been generated by obtaining an average value of each component of R, G, and B of the input image. In comparison, in the image processing apparatus 11, it is possible to more easily and quickly obtain a luminance image by directly using the Y (luminance) components of the input image as a luminance image. Furthermore, as a result, it is not necessary to provide a circuit for generating a luminance image, and the image processing apparatus 11 can be reduced in size.

In step S42, the difference calculation unit 52 generates a difference image by using the pyramid image supplied from the pyramid image generation unit 51, and supplies the difference image to the weight addition unit 53.

More specifically, the difference calculation unit 52 obtains a difference between the pyramid images of a combination of the hierarchies of level L2 and level L5, level L2 and level L6, level L3 and level L6, level L3 and level L7, and level L4 and level L7 among the pyramid images of the luminance of each hierarchy. As a result, a total of five difference images of luminance are obtained.

For example, in a case where a difference image of the combination of level L2 and level L5 is generated, the pyramid image of the level L5 is up-converted in accordance with the size of the pyramid image of the level L2.

That is, the pixel value of one pixel of the pyramid image of the level L5 before up-conversion is set as the pixel value of several mutually adjacent pixels of the pyramid image of the level L5 after up-conversion, which corresponds to one pixel. Then, the difference between the pixel value of the pixel of the pyramid image of the level L5 and the pixel value of the pixel of the pyramid image of level L2 at the same position as that of the pixel of the pyramid image of the level L5 is obtained, and the difference is set as the pixel value of the pixel of the difference image.

The process for generating these difference images is equivalent to that in which a filtering process using a bandpass filter is performed on a luminance image, and certain frequency components are extracted from the luminance image. The pixel value of the pixel of the difference image, which is obtained in the manner described above, indicates a difference between the pixel values of the pyramid images of each level, that is, a difference between the luminance in the predetermined pixel in the input image and the average luminance in the surrounding area of the pixel.

In general, an area having a large difference in luminance with the surrounding area in the image is an area that attracts the attention of a person who views the image. Consequently, the area has a high probability of being the area of the subject. Therefore, it may be said that a pixel having a large pixel value in each difference image is an area having a high probability of being an area of the subject.

In step S43, the weight addition unit 53 creates a luminance information map on the basis of the difference image supplied from the difference calculation unit 52, and supplies the luminance information map to the normalization unit 54.

For example, the weight addition unit 53 performs weight addition of five supplied difference images by using the difference weight Wa that is a weight for each difference image obtained in advance so as to create a luminance information map. That is, each of the pixel values of the pixels at the same position as that of each difference image is multiplied by the difference weight Wa, and the sum total of the pixel values that is multiplied by the difference weight Wa is obtained.

Meanwhile, when a luminance information map is to be created, the up-conversion of the difference image is performed so that the difference images become of the same size. Furthermore, the difference weight Wa is assumed to be obtained by learning in advance.

Next, the weight addition unit 53 converts the pixel value of the pixel of the obtained luminance information map by using the same conversion table as the conversion table held by the subject map creation unit 26, and supplies the thus obtained luminance information map to the normalization unit 54.

Also, in the weight addition unit 53, it is possible to more easily and quickly perform conversion by converting the luminance information map by using the conversion table.

In step S44, the normalization unit 54 normalizes the luminance information map from the weight addition unit 53, and supplies the thus obtained luminance information map as the final luminance information map to the subject map creation unit 26. Then, upon output of the luminance information map, the luminance information extraction process is completed. Thereafter, the process proceeds to step S12 of FIG. 9.

For example, first, the normalization unit 54 linearly normalizes a luminance information map. For example, when the range of the pixel value of the luminance information map is a range of 0 to 200, the range of the pixel value is made to be a range of 0 to 255 by linear normalization.

Next, the normalization unit 54 obtains the average value of the pixel values of the pixels of the luminance information map that has been linearly normalized. That is, the total value of the pixel values of all the pixels of the luminance information map is divided by the number of pixels of the luminance information map so as to obtain an average value.

Furthermore, the normalization unit 54 sets the value obtained by subtracting the obtained average value from the pixel value of each pixel of the linearly normalized luminance information map as the pixel value of the pixel of the final luminance information map.

Meanwhile, in more detail, regarding the pixel of the luminance information map, in which the value obtained by subtracting the average value from the pixel value is a negative value (value less than 0), the pixel value of the pixel is set to 0. That is, the final pixel value of the pixel whose pixel value is smaller than or equal to the average value among the pixels of the linearly normalized luminance information map is set to 0.

Here, most of the values of noise contained in the luminance information map are smaller than or equal to the average value of each pixel of the luminance information map. Consequently, by subtracting the average value from the pixel value of each pixel, noise is reliably removed from the luminance information map. The reason for this is that the pixel value of the pixel of the noise portion is set to 0. Furthermore, in the linearly normalized luminance information map, in most cases, the pixel value of the pixel at the same position as that of the area of the subject in the input image is greater than the average value. Consequently, even if the average value is subtracted from the pixel value of the luminance information map and normalized, the detection accuracy of the subject is not decreased.

As described above, by linearly normalizing the luminance information map and by subtracting the average value from the pixel value of the luminance information map after linear normalization, it is possible to more easily and quickly normalize the luminance information map. In particular, according to the luminance information extraction processing unit 21, it is possible to obtain a noise removal effect to approximately the same degree as in a case where a DOG filter is used with linear normalization and a simple process of calculation and subtraction of the average value.

That is, hitherto, the normalization of an information map is performed by a filtering process using a DOG filter. This filtering process involves a large number of processes, and it is not possible to quickly perform normalization. In comparison, it is possible for the normalization unit 54 to more quickly normalize a luminance information map with a simpler process when compared to the case in which a DOG filter is used. Moreover, the normalization makes it possible to more reliably remove noise from the luminance information map, and the detection accuracy of the area of the subject is not decreased.

As described above, the luminance information extraction unit 21 creates a luminance information map from the input image. According to the luminance information map obtained in the manner described above, it is possible to easily detect an area in which a difference in luminance is large in the input image, that is, an area that is easily recognizable by an observer who casts a quick glance at the input image.

[Description of Color Information Extraction Process]

Figure 11:
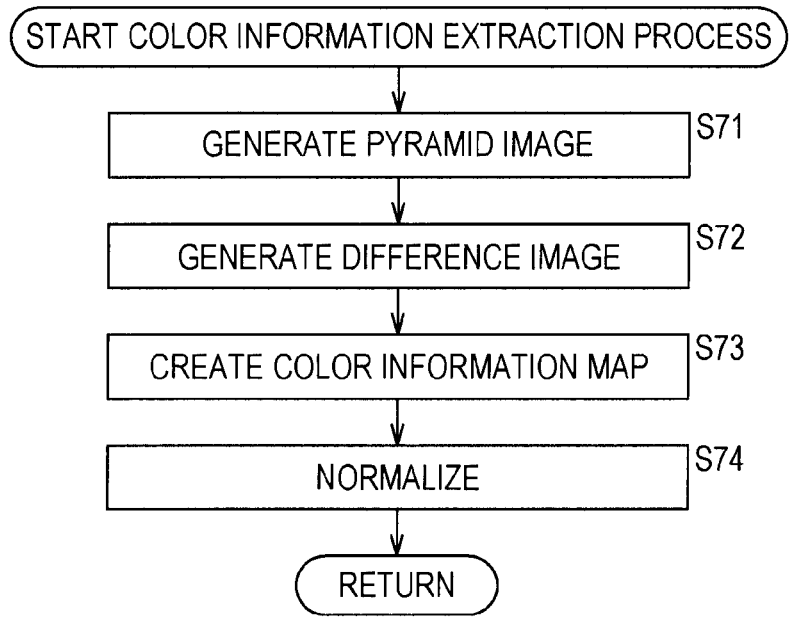
FIG. 11 is a flowchart illustrating a color information extraction process.

Next, a description will be given below, with reference to the flowchart of FIG. 11, of a color information extraction process by the process of step S12 of FIG. 9.

In step S71, the pyramid image generation unit 81 and the pyramid image generation unit 82 generate pyramid images in the hierarchies of the level L1 to the level L7 on the basis of the Cr image and the Cb image composed of color-difference components of the supplied input image. That is, the processes identical to the processes described with reference to FIGS. 3 and 4 are performed, and a pyramid image of Cr and a pyramid image of Cb are generated.

The pyramid image generation unit 81 and the pyramid image generation unit 82 supply the generated pyramid images to the difference calculation unit 83 and the difference calculation unit 84, respectively.

As described above, also, in the color information extraction unit 22, similarly to the case of the luminance information extraction unit 21, since it is sufficient that pyramid images of seven hierarchies are generated, it is possible to more easily and quickly obtain a color information map than in the related art.

Furthermore, in visual attention of the related art, as color information, a difference between the R and G components of the pixel of the input image, and a difference between B and Y (yellow) components thereof are extracted. Consequently, a process for obtaining these differences is necessary.

In comparison, in the image processing apparatus 11, by directly setting the color-difference components of the input image as the Cr image and the Cb image, it is possible to more easily and quickly obtain extracted information images regarding colors. Furthermore, as a result, it is not necessary to provide a circuit for obtaining a difference, thereby making it possible to reduce the size of the image processing apparatus 11.

In step S72, the difference calculation unit 83 and the difference calculation unit 84 generate difference images on the basis of the pyramid images supplied from the pyramid image generation unit 81 and the pyramid image generation unit 82, respectively, and supply the difference images to the weight addition unit 85 and the weight addition unit 86, respectively.

For example, the difference calculation unit 83 obtains differences between pyramid images of the combination of level L2 and level L5, level L2 and level L6, level L3 and level L6, level L3 and level L7, and level L4 and level L7 among the pyramid images of Cr of the hierarchies. As a result, a total of five difference images of Cr are obtained. Meanwhile, when the difference image is to be generated, the pyramid image having a smaller number of pixels is up-converted in accordance with the pyramid image having a larger number of pixels.

Furthermore, the difference calculation unit 84 generates a total of five difference images of Cb by performing a process identical to that of the difference calculation unit 83.

The process for generating these difference images is equivalent to that in which a filtering process using a bandpass filter is performed on a Cr image or a Cb image so as to extract predetermined frequency components from the Or image or the Cb image. The pixel value of the pixel of the difference image obtained in the manner described above indicates a difference between pyramid images of levels, that is, a difference between components of a specific color in the pixel of the input image and components of an average specific color in the surrounding area of the pixel.

In general, an area having a conspicuous color in comparison with the surrounding area in the image, that is, an area having a large difference with the surrounding area of specific color components, is an area that attracts the attention of the person who views the image. Hence, the area has a high probability of being the area of a subject. Therefore, it may be said that the pixel having a larger pixel value in each difference image indicates that the area is more probable to be the area of the subject.

In step S73, on the basis of the difference images supplied from the difference calculation unit 83 and the difference calculation unit 84, the weight addition unit 85 and the weight addition unit 86 generate a color information map of Cr and a color information map of Cb, and supply them to the normalization unit 87 and the normalization unit 88, respectively.

For example, the weight addition unit 85 performs weight addition of the difference images of Cr supplied from the difference calculation unit 83 by using the difference weight Wa for each difference image obtained in advance, thereby forming one color information map of Cr. Next, the weight addition unit 85 converts the pixel value of the pixel of the obtained color information map of Cr by using the same conversion table as the conversion table held by the subject map creation unit 26, and supplies the thus obtained color information map to the normalization unit 87.

Similarly, the weight addition unit 86 performs weight addition of the difference images of Cb supplied from the difference calculation unit 84 by using the difference weight Wa obtained in advance so as to form one color information map of Cb, converts the color information map of Cb by using a conversion table, and supplies it to the normalization unit 88.

Also, in the weight addition unit 85 and the weight addition unit 86, by converting the color information map by using a conversion table, it is possible to more easily and quickly perform conversion. Meanwhile, when a color information map is to be created, the difference images are up-converted so that the difference images will have the same size.

In step S74, the normalization unit 87 and the normalization unit 88 normalize the color information maps from the weight addition unit 85 and the weight addition unit 86, respectively, and supplies the thus obtained color information maps as the final color information maps to the subject map creation unit 26. For example, the normalization unit 87 and the normalization unit 88 perform a process identical to the process of step S44 of FIG. 10 so as to normalize the color information map of Cr and the color information map of Cb.

Figure 9:
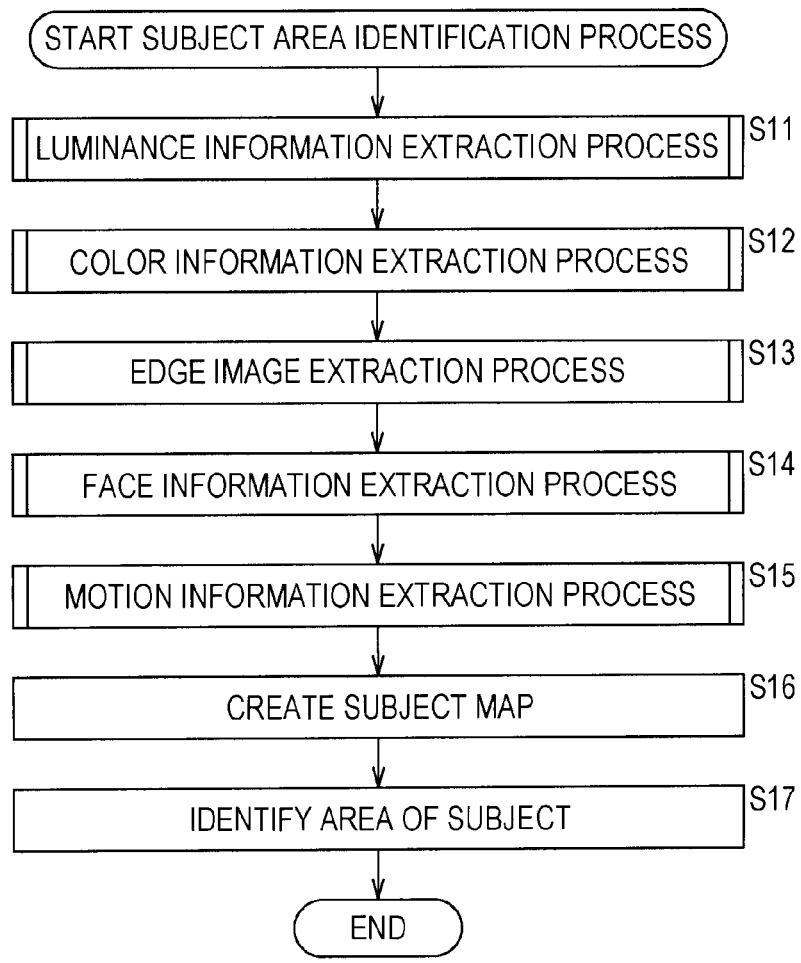
FIG. 9 is a flowchart illustrating a subject area identification process.
Figure 10:
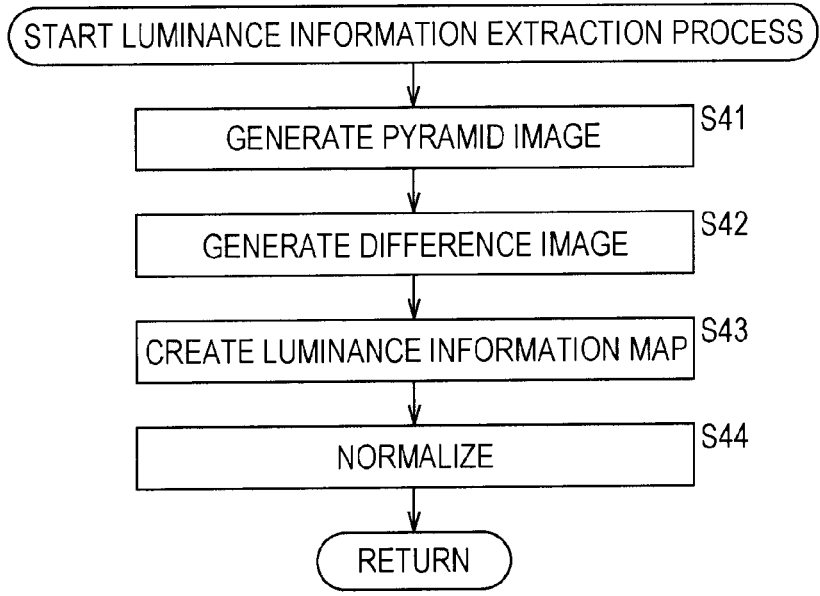
FIG. 10 is a flowchart illustrating a luminance information extraction process.

Then, upon output of the color information map, the color information extraction process is completed, and thereafter the process proceeds to step S13 of FIG. 9.

As described above, by normalizing the color information map and by subtracting the average value from the pixel value of the color information map after linear normalization, it is possible to more easily and quickly normalize the color information map.

In the manner described above, the color information extraction unit 22 extracts the image of the components of the specific color from the input image, and creates a color information map from the image. According to the color information map obtained in the manner described above, it is possible to easily detect an area having larger components of the specific color in comparison with the surrounding area in the input image, that is, an area that is easily recognizable by an observer who casts a quick glance at the input image.

Meanwhile, in the color information extraction unit 22, as information on colors extracted from the input image, Cr and Cb components are extracted. However, a difference between R (red) components and G (green) components and a difference between B (blue) components and Y (yellow) components may be extracted.

[Description of Edge Information Extraction Process]

Next, a description will be given below, with reference to the flowchart of FIG. 12, of an edge information extraction process corresponding to the process of step S13 of FIG. 9.

In step S111, on the basis of the supplied input image, the edge image generation unit 111 through to the edge image generation unit 114 generate edge images in which edge strengths in the directions of 0 degrees, 45 degrees, 90 degrees, and 135 degrees are pixel values of pixels.

Figures 13, 14, 15:
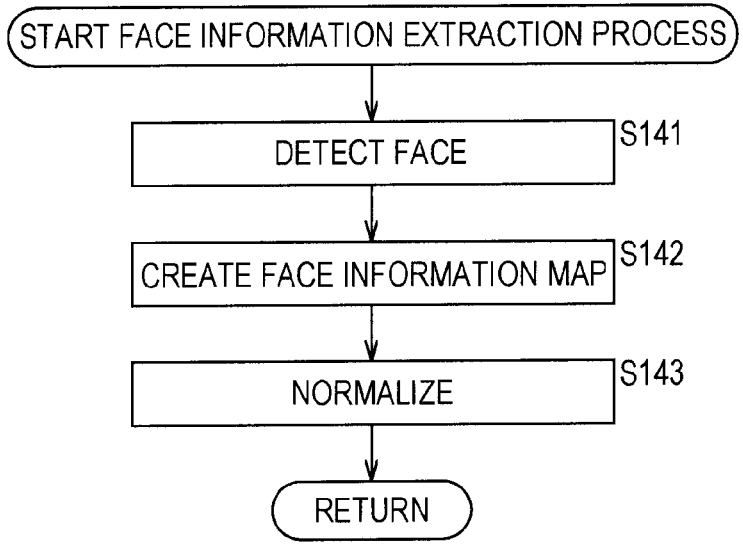
FIG. 13 illustrates an example of a filter for extracting an edge.
FIG. 14 illustrates an example of a filter for extracting an edge.
FIG. 15 is a flowchart illustrating a face information extraction process.

For example, the edge image generation unit 111 through to the edge image generation unit 114 hold in advance filters shown in FIG. 13, and generate edge images as extracted information images by using these filters. In an example of FIG. 13, each of a filter 1, a filter 2, a filter 45, and a filter 135 is one filter.

The numerical values "−1, −2, −1, 2, 4, 2, −1, −2, −1" in the filter 1 indicate coefficients that are multiplied by the pixel of the input image.

Here, a predetermined direction in the input image, for example, the horizontal direction, in FIG. 4 will be referred to as an x direction, and a direction perpendicular to the x direction, that is, the vertical direction in FIG. 4, will be referred to as a y direction.

In this case, in the filtering process using the filter 1, the pixel values of nine pixels that are arranged consecutively in the x direction are multiplied by the coefficients "−1", "−2", "−1", "2", "4", "2", "−1", "−2", and "−1", respectively, and the sum of the pixel values multiplied by the coefficients is divided by "16". Then, the thus obtained value is made to be a pixel value obtained by performing a filtering process using the filter 1 on the pixel in the center of the nine pixels that are arranged consecutively.

In FIG. 13, the coefficients of the filter 1 are arranged in the same arrangement as that of the pixels by which those coefficients are multiplied. Therefore, for example, the coefficient "−1" is multiplied by the pixel positioned at both ends of the pixels arranged in the x direction, and the pixel positioned in the center among the pixels arranged in the x direction is multiplied by the coefficient "4".

Meanwhile, in FIG. 13, the coefficients of the other filters are arranged in the same arrangement as that of the pixels by which those coefficients are multiplied.

Furthermore, in the filtering process using the filter 2, the pixel values of eight pixels that are arranged consecutively in the x direction are multiplied by the coefficients "1", "3", "3", "1", "1", "3", "3", and "1", and the sum of the pixel values by which the coefficients are multiplied is divided by "16". Then, the thus obtained value is made to be a pixel value obtained by a filtering process using the filter 2 on the pixel (in more detail, as a result, the pixel with which the fourth or fifth coefficient "1" is multiplied in the figure) in the center of the eight pixels that are arranged consecutively.

In the filtering process using the filter 45, pixels within an area composed of a total of 9 pixels (3 pixels in the x direction and 3 pixels in the y direction) are used. The pixel values of those pixels are multiplied by the coefficients "0", "1", "2", "−1", "0", "1", "−2", "−1", and "0". Then, the sum of the pixel values of the pixels by which the coefficients are multiplied is divided by "8", and the thus obtained value is made to be a pixel value obtained by performing a filtering process using the filter 45 on the pixel positioned in the center of the area for which processing is performed. Therefore, for example, the pixel positioned in the center of the target area to be processed is multiplied by a coefficient "0", and the pixel adjacent to the left side of the pixel in the figure is multiplied by a coefficient "−1".

Furthermore, in the filtering process using the filter 135, pixels in an area composed of a total of 9 pixels (3 pixels in the x direction and 3 pixels in the y direction) are used. The pixel values of those pixels are multiplied by the coefficients "2", "1", "0", "1", "0", "−1", "0", "−1", and "−2", respectively. Then, the sum of the pixel values of the pixels by which the coefficient is multiplied is divided by "8", and the thus obtained value is made to be a pixel value obtained by performing a filtering process using the filter 135 on the pixel positioned in the center of the target area to be processed.

For example, the edge image generation unit 111 performs a filtering process using the filter 1 on the input image, and sets the image obtained by performing a filtering process using the filter 2 on the thus obtained image to be an edge image in the direction of 0 degrees. Furthermore, the edge image generation unit 112 sets the image obtained by performing a filtering process using the filter 45 on the input image to be an edge image in the direction of 45 degrees.

The edge image generation unit 113 performs a filtering process using the filter 2 on the input image, and sets the image obtained by further performing a filtering process using the filter 1 on the thus obtained image to be an edge image in the direction of 90 degrees. Furthermore, the edge image generation unit 114 sets the image obtained by performing a filtering process using the filter 135 on the input image to be an, edge image in the direction of 135 degrees.

As described above, the edge image generation unit 111 through to the edge image generation unit 114 generate an edge image in each direction by using at least one of the filter 1, the filter 2, the filter 45, and the filter 135 that are held in advance. These filters are filters that are obtained by approximating a Gabor filter and have characteristics close to those of a Gabor filter.

Therefore, by using these filters, an edge image in each direction, which is similar to that in the case of using a Gabor filter, is obtained. Moreover, the filtering process using these filters is a calculation of weight addition using a pre-specified coefficient, and the filtering process does not need a complex computation, such as an exponential computation.

In visual attention of the related art, a Gabor filter is used to obtain an edge image. However, in the image processing apparatus 11, by performing a filtering process by combining the filter 1, the filter 2, the filter 45, and the filter 135, it is possible to more easily and quickly obtain an edge image.

Meanwhile, the filter used to generate an edge image is not limited to the example shown in FIG. 13, and a filter in which a Sobel filter and a Roberts filter are combined may be used. In such a case, for example, a filter shown in FIG. 14 is used.

In the example of FIG. 14, the filter 0, the filter 90, the filter 45, and the filter 135 are each made to be one filter. Meanwhile, in FIG. 14, the coefficients of the filters are arranged in the same arrangement as that of the pixels of the input image with which those coefficients are multiplied.

The numerical values "1, 2, 1, 0, 0, 0, −1, −2, and −1" in the filter 0 indicate coefficients multiplied by the pixels of the input image. In the filtering process using the filter 0, pixels in an area composed of a total of 9 pixels, that is, 3 pixels in the x direction and 3 pixels in the y direction, are used, and the coefficients "1", "2", "1", "0", "0", "0", "−1", "−2", and "−1" are multiplied by the pixel values of those pixels. Then, the sum of the pixel values of the pixels with which the coefficients are multiplied is divided by "8", and the thus obtained value is made to be a pixel value obtained by performing a filtering process using the filter 0 on the pixel positioned in the center of the target area to be processed. Therefore, for example, the pixel positioned in the center of the target area to be processed is multiplied by a coefficient "0", and the pixel adjacent to the upper side in the figure of the pixel is multiplied by a coefficient "2".

Similarly, in the filtering process using the filter 90, pixels in an area composed of a total of 9 pixels, that is, 3 pixels in the x direction and 3 pixels in the y direction, are used. The pixel values of those pixels are multiplied by the coefficients "1", "0", "−1", "2", "0", "−2", "1", "0", and "−1", respectively. Then, the sum of the pixel values of the pixels multiplied by the coefficients is divided by "8", and the thus obtained value is made to be a pixel value obtained by performing a filtering process using the filter 90 on the pixel positioned in the center of the target area to be processed.

Furthermore, in the filtering process using the filter 45, pixels in an area composed of a total of 4 pixels, that is, 2 pixels in the x direction and 2 pixels in the y direction, are used, and the pixel values of those pixels are multiplied by coefficients "0", "1", "−1", and "0", respectively. Then, the sum of the pixel values of the pixels multiplied by the coefficients is divided by "2", and the thus obtained value is made to be a pixel value obtained by performing a filtering process using the filter 45 on the pixel positioned in the center of the target area to be processed (in more detail, the pixel multiplied by the coefficient "0" in the upper left side).

Furthermore, in the filtering process using the filter 135, pixels in an area composed of a total of 4 pixels, that is, 2 pixels in the x direction and 2 pixels in the y direction, are used, and the pixel values of those pixels are multiplied by the coefficients "1", "0", "0", and "−1", respectively. Then, the sum of the pixel values of the pixels that are multiplied by the coefficients is divided by "2", and the thus obtained value is made to be a pixel value that is obtained by performing a filtering process using the filter 135 on the pixel positioned in the center of the target area to be processed (in more detail, the pixel that is multiplied by the coefficient "1" in the left upper side).

For example, the edge image generation unit 111 through to the edge image generation unit 114 perform a filtering process using the filter 0, the filter 45, the filter 90, and the filter 135 on the input image, respectively, and the thus obtained images are made to be edge images in the direction of 0 degrees, 45 degrees, 90 degrees, and 135 degrees.

As described above, also in the case of the example of FIG. 14, a complex computation process, such as an exponential computation, is not necessary for a filtering process. Thus, it is possible to more easily and quickly obtain an edge image.

Figure 12:
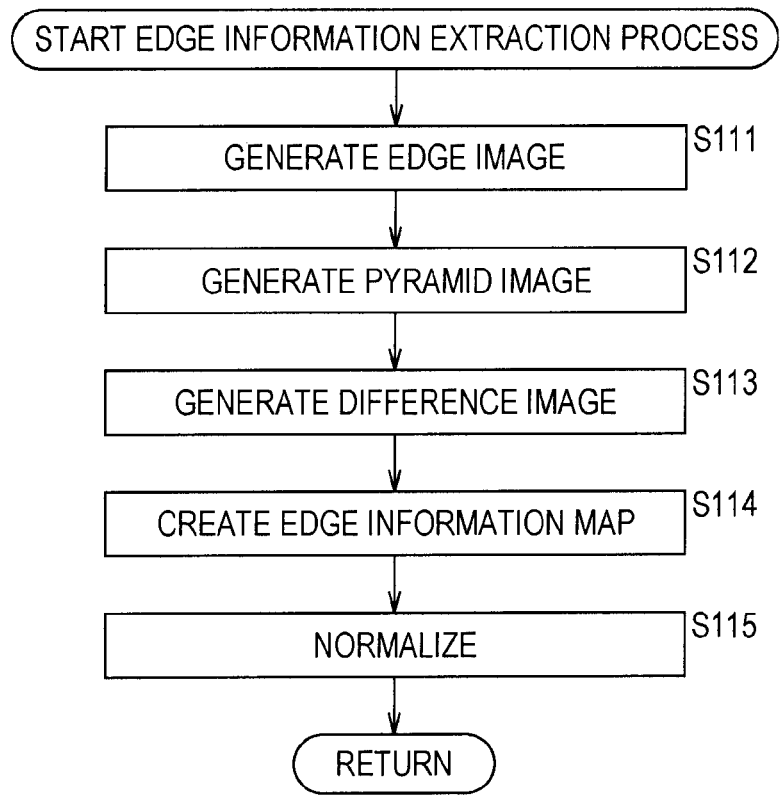
FIG. 12 is a flowchart illustrating an edge information extraction process.

Referring back to the description of the flowchart of FIG. 12, when the edge image generation unit 111 through to the edge image generation unit 114 generate edge images in each direction, they supply the generated edge images to the pyramid image generation unit 115 through to the pyramid image generation unit 118, respectively.

In step S112, on the basis of the edge image, the edge image generation unit 111 through to the edge image generation unit 114, and the pyramid image generation unit 115 through to the pyramid image generation unit 118 generate pyramid images and supply them to the difference calculation unit 119 through to the difference calculation unit 122, respectively.

That is, the same processes as the processes described with reference to FIGS. 3 and 4 are performed, and pyramid images of the hierarchies of the level L1 to the level L7 are generated with regard to the edge image in each direction. Also, in the edge information extraction unit 23, similarly to the case of the luminance information extraction unit 21, it is sufficient that pyramid images of seven hierarchies are generated. Thus, it is possible to obtain an edge information map more easily and quickly than in the related art.

In step S113, on the basis of the pyramid images supplied from the pyramid image generation unit 115 through to the pyramid image generation unit 118, the difference calculation unit 119 through to the difference calculation unit 122 generate difference images, and supplies them to the weight addition unit 123 through to the weight addition unit 126, respectively.

For example, the difference calculation unit 119 obtains a difference in the pyramid images of a combination of the hierarchies of level L2 and level L5, level L2 and level L6, level L3 and level L6, level L3 and level L7, and level L4 and level L7 among the pyramid images in the direction of 0 degrees of each hierarchy. As a result, a total of five difference images are obtained. Meanwhile, when a difference image is to be generated, the pyramid image having a smaller number of pixels is up-converted in accordance with the pyramid image having a larger number of pixels.

Furthermore, the difference calculation unit 120 through to the difference calculation unit 122 perform the same processes as those of the difference calculation unit 119 so as to generate a total of five difference images.

The process for generating these difference images is equivalent to that in which a filtering process using a bandpass filter is performed on an edge image so as to extract predetermined frequency components from the edge image. The pixel value of the pixel of the difference image obtained in the manner described above indicates a difference in the edge strengths of the pyramid images of each level, that is, the edge strength at a predetermined position of the input image and the average edge strength in the surrounding area of the position.

In general, an area having an edge strength greater than in the surrounding area in the image is an area that attracts the attention of a person who views the image. Consequently, the area has a high probability of being an area of the subject. Therefore, in each difference image, it can be said that a pixel having a larger pixel value indicates an area having a higher probability of being an area of the subject.

In step S114, on the basis of the difference images supplied from the difference calculation unit 119 through to the difference calculation unit 122, the weight addition unit 123 through to the weight addition unit 126 create edge information maps in the direction of 0 degrees, 45 degrees, 90 degrees, and 135 degrees.

For example, the weight addition unit 123 performs weight addition of the difference images in the direction of 0 degrees, which are supplied from the difference calculation unit 119 by using the difference weight Wa for each difference image obtained in advance so as to be formed as one edge information map in the direction of 0 degrees. Next, the weight addition unit 123 converts the pixel value of the pixel of the obtained edge information map in the direction of 0 degrees by using the same conversion table as the conversion table held by the subject map creation unit 26, and supplies the thus obtained edge information map to the normalization unit 127.

Similarly, the weight addition unit 124 through to the weight addition unit 126 perform weight addition of the difference images of each direction, which are supplied from the difference calculation unit 120 through to the difference calculation unit 122, by using the difference weight Wa obtained in advance so as to be formed as one edge information map. Then, the weight addition unit 124 through to the weight addition unit 126 convert the obtained edge map by using a conversion table and supply it to the normalization unit 128 through to the normalization unit 130.

Also, in the weight addition unit 123 through to the weight addition unit 126, by converting an edge information map by using a conversion table, it is possible to more easily and quickly perform conversion. Meanwhile, when an edge information map is to be created, up-conversion of the difference image is performed so that the difference images will have the same size.

In step S115, the normalization unit 127 through to the normalization unit 130 normalize the edge information maps from the weight addition unit 123 through to the weight addition unit 126, and supply the thus obtained final edge information maps to the subject map creation unit 26. For example, the normalization unit 127 through to the normalization unit 130 perform the same process as the process of step S44 of FIG. 10 so as to normalize the edge information map in each direction.

Then, upon output of the edge information map, the edge information extraction process is completed, and thereafter the process proceeds to step S14 of FIG. 9.

As described above, by linearly normalizing the edge information map and by subtracting the average value of the pixel values from the edge information map after linear normalization, it is possible to more easily and quickly normalize the edge information map.

In the manner described above, the edge information extraction unit 23 obtains a difference image of edges in the direction of a specific direction from the input image, and creates an edge information map from the difference image. According to the edge information map for each direction obtained in the manner described above, it is possible to easily detect an area having a large edge strength in the direction of a specific direction in comparison with the surrounding area in the input image, that is, an area that is easily recognizable by an observer who casts a quick glance at the input image.

[Description of Face Information Extraction Process]

Next, a description will be given, with reference to the flowchart of FIG. 15, of a face information extraction process corresponding to the process of step S14 of FIG. 9.

In step S141, the face detection unit 161 detects the area of the face of a person from the supplied input image, and supplies the detection result to the face information map creation unit 162. For example, the face detection unit 161 performs a filtering process using a Gabor filter on an input image, and detects the area of the face in the input image by extracting feature areas, such as the eyes, the mouth, the nose, and the like from the input image.

In step S142, the face information map creation unit 162 creates a face information map by using the detection result from the face detection unit 161, and supplies the face information map to the normalization unit 163.

It is assumed that, for example, as the detection result of the face from the input image, a plurality of rectangular areas (hereinafter referred to as candidate areas) in the input image, in which a face is estimated to be contained, are detected. Here, it is also assumed that a plurality of candidate areas are detected in the vicinity of a predetermined position in the input image, and portions of those candidate areas may overlap with one another. That is, for example, in a case where a plurality of areas containing a face with respect to the area of one face in the input image are obtained as candidate areas, portions of those candidate areas overlap with one another.

The face information map creation unit 162 generates a detection image having the same size as that of the input image for each candidate area with respect to the candidate area obtained by detecting the face. This detection image is formed in such a manner that the pixel value of the pixel in the same area as the candidate area to be processed in the detection image is a value greater than the pixel value of the pixel in an area different from the candidate area.

Furthermore, the greater the pixel value of the pixel in the detection image, the greater the pixel value of the pixel at the same position as that of the candidate area that is estimated that the probability of containing the face of a person is high. The face information map creation unit 162 adds up detection images obtained in the manner described above so as to generate one image, thereby forming a face information map. Therefore, in the face information map, the pixel value of the pixel in the same area as the area that overlaps portions of the plurality of candidate areas in the input image is increased, and the probability that the face is contained is high.

In step S143, the normalization unit 163 normalizes the face information map supplied from the face information map creation unit 162, and supplies the thus obtained face information map as a final face information map to the subject map creation unit 26. For example, the normalization unit 163 performs the same process as the process of step S44 of FIG. 10 so as to normalize the face information map.

Then, upon output of the face information map, the face information extraction process is completed, and thereafter the process proceeds to step S15 of FIG. 9.

In the manner described above, the face information extraction unit 24 detects a face from the input image, and creates a face information map from the detection result. According to the face information map obtained in the manner described above, it is possible to easily detect the area of the face of a person as a subject.

[Description of Motion Information Extraction Process]

Figure 16:
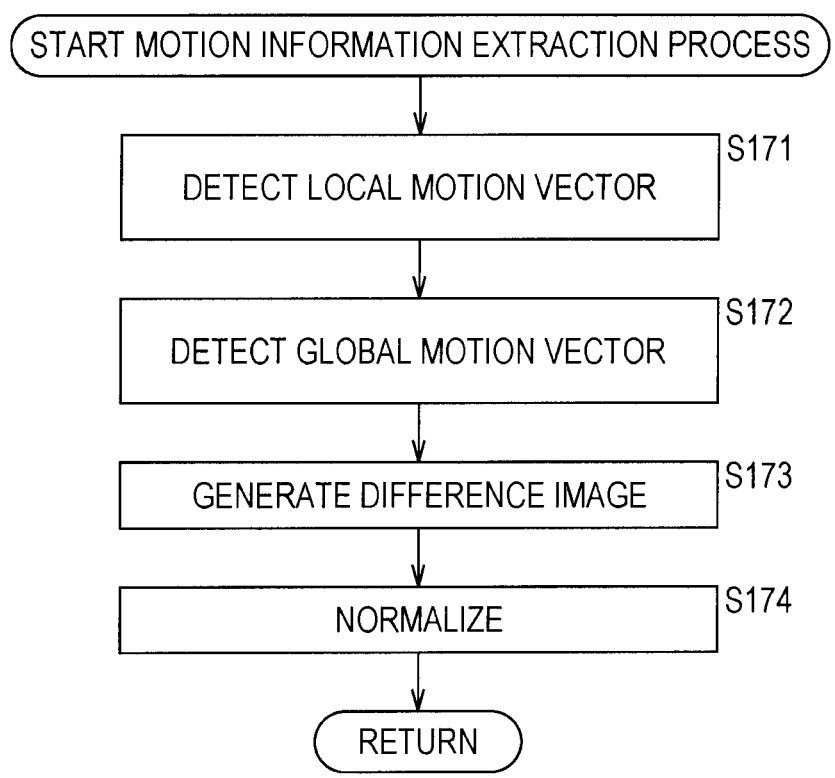
FIG. 16 is a flowchart illustrating a motion information extraction process.

Furthermore, with reference to the flowchart of FIG. 16, a motion information extraction process corresponding to the process of step S15 of FIG. 9 will be described.

In step S171, the local motion vector extraction unit 191 detects a local motion vector of each pixel of an input image by a gradient method or the like by using the supplied input image, and supplies the local motion vector to the difference calculation unit 193.

In step S172, the global motion vector extraction unit 192 detects a global motion vector by using the supplied input image, and supplies the global motion vector to the difference calculation unit 193.

In step S173, the difference calculation unit 193 obtains the absolute value of a difference between the local motion vector from the local motion vector extraction unit 191 and the global motion vector from the global motion vector extraction unit 192 so as to generate the difference image of the motion. Then, the difference calculation unit 193 supplies the generated difference image of the motion to the normalization unit 194.

In step S174, the normalization unit 194 creates a motion information map by normalizing the difference image supplied from the difference calculation unit 193, and supplies the thus obtained motion information map as a final motion information map to the subject map creation unit 26. For example, the normalization unit 194 performs the same process as the process of step S44 of FIG. 10 so as to normalize the motion information map.

Then, upon output of the motion information map, the motion information extraction process is completed, and thereafter the process proceeds to step S16 of FIG. 9.

In the manner described above, the motion information extraction unit 25 detects a motion from the input image and creates a motion information map from the detection result. In the input image, the area of an object body in motion is an area that is easily recognizable by an observer who casts a quick glance at the input image, and has a high probability of being a subject.

According to the luminance information extraction process through to the motion information extraction process described in the foregoing, information maps are obtained, and a subject map is created on the basis of these information maps.

In the manner described above, by linearly normalizing an information map and by subtracting an average value from the pixel value of the information map after linear normalization in the normalization of each information map, it is possible to more easily and quickly normalize the information map. As a result, it is possible to more easily and quickly obtain an information map for identifying the area of a subject in the image. Moreover, when an information map is to be normalized, by subtracting an average value from the pixel value of the information map, it is possible to more reliably remove noise with a simple process.

[Learning of Weight]

By the way, in the image processing apparatus 11, a plurality of items of information that is estimated to have more areas of the subject are extracted from the input image, and by creating a subject map by using those items of information, areas of the subject are detected more reliably from the input image. The more the area is estimated to receive attention from an observer who casts a quick glance at the input image, the greater the pixel value of the subject map in the input image. Consequently, without being limited to a case in which the subject is a person, it is possible to detect the subject even if the subject is an ordinary one, such as an animal, a plant, or a building.

Information, such as luminance, color, edge, face, and motion, is extracted from the input image so as to create such a subject map. That is, difference images from the pyramid images of those extracted information are made to be information maps by being subjected to weight addition using the difference weight Wa, and those information maps are subjected to weight addition using the information weight Wb. Then, furthermore, the thus obtained image (map) is multiplied by the subject weight Wc and is formed as a subject map.

The difference weight Wa, the information weight Wb, and the subject weight Wc, which are used when a subject map is to be created, are obtained by learning using, for example, a neural network. If images containing an ordinary subject are used as learning images that are used during learning of these weights without being limited to a person, a subject map that is created using a weight obtained by the learning makes it possible to more reliably detect an ordinary subject from the input image.

A description will be given below of learning of the difference weight Wa, the information weight Wb, and the subject weight Wc that are used to create a subject map.

Figure 17:
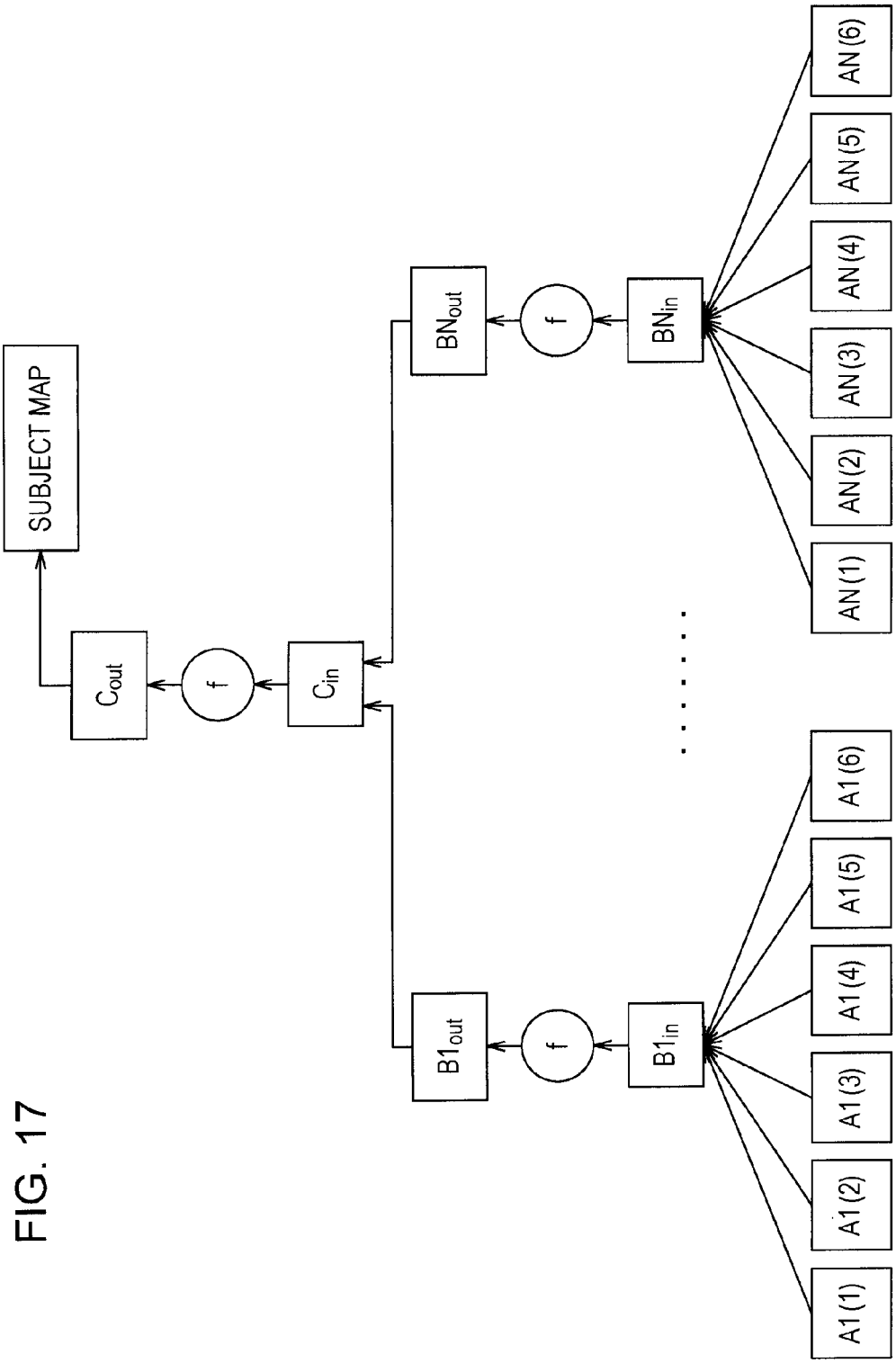
FIG. 17 illustrates learning using a neural network.

During learning, as shown in FIG. 17, the difference weight Wa, the information weight Wb, and the subject weight Wc, which are provided with an initial value, and a learning image containing a subject are used so as to create a subject map.

More specifically, a difference image $An(m)$ (where $1 \leq n \leq N$, $1 \leq m \leq 6$) for each information item that is extracted from a pre-prepared learning image when a subject map is to be created. Here, the difference image $An(1)$ to the difference image $An(6)$ are difference images regarding one information item that is extracted from the learning image.

For example, the difference image $A1(1)$ through to the difference image $A1(6)$ are made to be difference images of luminance, which are generated by using pyramid images of luminance, which are obtained from the learning image. Furthermore, for example, the difference image AN(1) through to the difference image AN(6) are made to be difference images in the direction of 0 degrees, which are generated by using a pyramid image of an edge in the direction of 0 degrees, which is obtained from the learning image.

Meanwhile, in FIG. 17, an example is shown in which six difference images are obtained for each information extracted from the learning image. However, the number of difference images may be any number. For example, in the example of the image processing apparatus 11, the number of difference images is set to five.

When a difference image An(m) for each information is obtained from the learning image, information maps are created on the basis of those difference images and the difference weight Wa for each difference image. Meanwhile, hereinafter, the difference weight Wa to be multiplied with the difference image An(m) will also be referred to as a difference weight Wan(m).

For example, the difference image A1(1) through to the difference image A1(6) are subjected to weight addition using a difference weight Wa1(1) through to a difference weight Wa1(6) for each difference image, and are formed as an information map $B1_{in}$. Furthermore, a computation using the above-mentioned Expression (1), that is, a sigmoid function f(x), is performed on this information map $B1_{in}$, and as a result, an information map $B1_{out}$ is obtained.

That is, a value f(x) obtained by substituting the pixel value x of the pixel of the information map $B1_{in}$ for Expression (1) is made to be the pixel value of the pixel of the information map $B1_{out}$ at the same position as that of the pixel. The information map $B1_{out}$ obtained in the manner described above corresponds to an information map, for example, a luminance information map, created in the image processing apparatus 11.

Meanwhile, the sigmoid function f(x) is not limited to a hyperbolic cosine function and may be any function. For example, in an ideal model, f(x) is a function that outputs a value "1" when x≥0 and that outputs a value "−1" when x<0.

As described above, when N information maps $B1_{out}$ to $BN_{out}$ are obtained, the information map $Bn_{out}$ (where 1≤n≤N) thereof is subjected to weight addition using the information weight Wb for each information map and is formed as a subject map $C_{in}$. Then, a computation using a sigmoid function f(x) is performed on this subject map $C_{in}$. As a result, a subject map $C_{out}$ is obtained. Furthermore, this subject map $C_{out}$ is multiplied by the subject weight Wc so as to be normalized, and is formed as a final subject map.

Meanwhile, in more detail, when the subject map $C_{in}$ is to be created, an information map obtained without generating a difference image, for example, an information map such as a face information map, is used so as to perform weight addition. Furthermore, in the following, the information weight Wb that is multiplied with the information map $Bn_{out}$ will also be referred to as an information weight Wbn.

Figure 18:
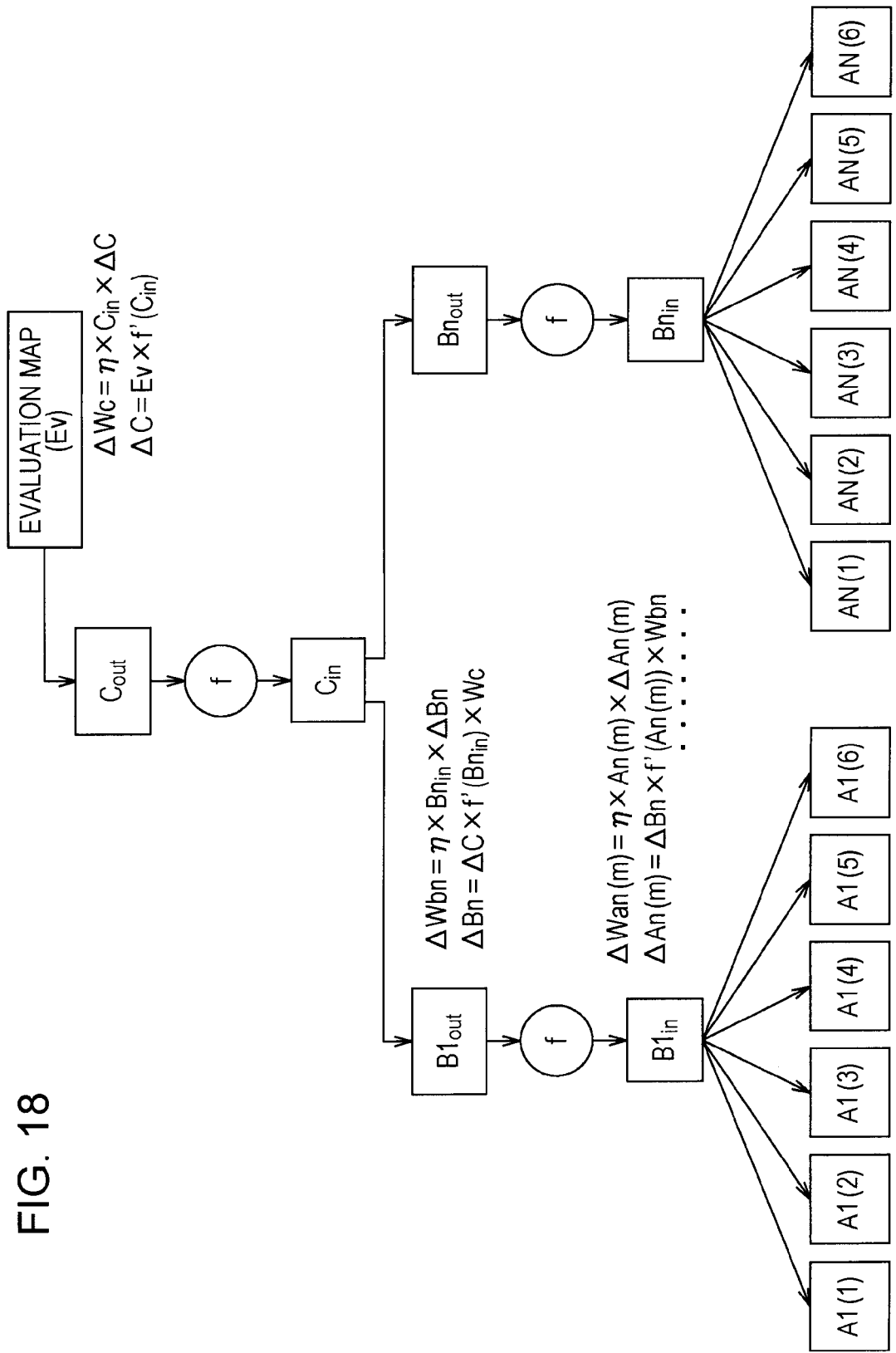
FIG. 18 illustrates learning using a neural network.

In the manner described above, a process for creating a subject map during learning is called forward propagation. When the subject map is created, next, as shown in FIG. 18, a process called back propagation is performed, and the difference weight Wa, the information weight Wb, and the subject weight Wc are updated. In the process called back propagation, the created subject map and an image label that is information indicating the area of the subject in the learning image, which is prepared in advance with respect to the learning image, are used so as to obtain a difference of weights that are values by which each weight should be increased/decreased.

Here, the image label is an image having the same size as that of the learning image, and is an image in which the pixel value of the pixel at the same position as that of the pixel of the area of the subject in the learning image is set to 1, and the pixel value of the pixel at the same position as that of the pixel of the area having no subject in the learning image is set to 0.

In back propagation, first, the difference between the subject map and the image label is obtained, and the thus obtained image is set as an evaluation map. Then, on the basis of the evaluation map and the subject map $C_{in}$, a subject weight difference ΔWc, which is an amount by which the subject weight Wc should be changed, is obtained in accordance with the following expression (2).

$$\Delta Wc = \eta \times C_{in} \times \Delta C \quad (2)$$

In Expression (2), η denotes a learning speed that is a pre-specified constant, and $C_{in}$ denotes a subject map $C_{in}$. Meanwhile, in more detail, $C_{in}$ in Expression (2) is the pixel value of one pixel of the subject map $C_{in}$, and a subject weight difference ΔWc is obtained for each pixel. Furthermore, ΔC is a difference of subject maps, and is obtained in accordance with the following expression (3).

$$\Delta C = EV \times f'(C_{in}) \quad (3)$$

In Expression (3), EV denotes an evaluation map, and $f'(C_{in})$ is a value obtained by substituting the subject map $C_{in}$ for the function obtained by differentiating the sigmoid function f(x). The function f'(x) obtained by differentiating the function f(x) is, more specifically, a function shown in the following expression (4).

$$f'(x) = a \times b \times sech(x \times b)^2 \quad (4)$$

When the subject weight difference ΔWc is obtained in the manner described above, the subject weight difference ΔWc is added to the subject weight Wc thus far and is updated, and a new subject weight Wc is obtained.

Next, by using the updated subject weight Wc and the information map $Bn_{in}$ that is created when the subject map is created, an information weight difference ΔWbn that is an amount by which the information weight Wbn should be changed is obtained in accordance with the following expression (5).

$$\Delta Wbn = \eta \times Bn_{in} \times \Delta Bn \quad (5)$$

In Expression (5), η denotes a learning speed that is a pre-specified constant, and $Bn_{in}$ denotes an information map $Bn_{in}$. Meanwhile, in more detail, $Bn_{in}$ in Expression (5) is a pixel value of one pixel of the information map $Bn_{in}$, and the information weight difference ΔWbn is obtained for each pixel. Furthermore, ΔBn is a difference of information maps, and is obtained in accordance with the following expression (6).

$$\Delta Bn = \Delta C \times f'(Bn_{in}) \times Wc \quad (6)$$

In Expression (6), ΔC denotes a value obtained by calculating the above-mentioned Expression (3), and $f'(Bn_{in})$ is a value obtained by substituting the information map $Bn_{in}$ for the function obtained by differentiating the sigmoid function f(x). Furthermore, Wc is an updated subject weight Wc.

In the manner described above, when the information weight difference ΔWbn for the information map $Bn_{in}$ is obtained, the information weight difference ΔWbn is added to the information weight Wbn of the information map $Bn_{in}$ and is updated, and a new information weight Wbn is obtained.

Furthermore, the updated information weight Wbn and the difference image An(m) that is generated when the subject map is created are used to obtain a difference ΔWan(m) of difference weights, which is an amount by which the difference weight Wa should be changed in accordance with the following expression (7).

$$\Delta Wan(m) = \eta An(m) \times \Delta An(m) \quad (7)$$

In Expression (7), $\eta$ denotes a learning speed that is a pre-specified constant, and An(m) denotes a difference image An(m). Meanwhile, in more detail, An(m) in Expression (7) is the pixel value of one pixel of the difference image An(m), and the difference $\Delta Wan(m)$ is obtained for each pixel. Furthermore, $\Delta An(m)$ is the difference of the difference image and is obtained in accordance with the following expression (8).

$$\Delta An(m) = \Delta Bn \times f'(An(m)) \times Wbn \quad (8)$$

In Expression (8), $\Delta Bn$ denotes a value obtained by calculating the above-mentioned Expression (6), and f'(An(m)) is a value obtained by substituting the difference image An(m) for the function obtained by differentiating the sigmoid function f(x). Furthermore, Wbn is an updated information weight Wbn.

In the manner described above, when the difference $\Delta Wan$ (m) of the difference weight for the difference image An(m) is obtained, the difference $\Delta Wan(m)$ of the difference weight is added to the difference weight Wan(m) of the difference image An(m) and is updated, and a new difference weight Wan(m) is obtained.

Then, by using the difference weight Wa, the information weight Wb, and the subject weight Wc, which are updated as described above, and the learning image, the above-mentioned process is repeated, and a final difference weight Wa, a final information weight Wb, and a final subject weight Wc are obtained.

The process for repeatedly updating the difference weight Wan(m), the information weight Wbn, and the subject weight Wc is performed until, for example, the absolute value of the maximum value of the pixel value of the pixel of the evaluation map is smaller than or equal to a pre-specified threshold value, and updating of each weight is performed a pre-specified number of times or more. That is, the process for updating the weight is performed until a subject map in which a subject can be extracted from the image with a sufficient accuracy is obtained.

In the manner described above, in the learning using a neural network, an evaluation map is created on the basis of the subject map created using the pre-supplied weights, and the image label. Furthermore, a difference of weights, which is an amount of change by which each weight should be changed, is obtained from the evaluation map by back calculation.

Here, since the image label is information indicating the area of the subject in the learning image, the image label can be said to be information indicating, so to speak, a correct answer of the subject map. Therefore, the evaluation map, which is a difference between the subject map and the image label, indicates an error between the ideal subject map and the subject map created by using the supplied weight. By performing back calculation using the evaluation map, the error between the supplied weight and the ideal weight is obtained.

Then, the obtained error is an amount of change by which the supplied weight should be changed. If this amount of change is added to the weight, the ideal weight at the current moment is obtained. If a subject map is created by using the weight that is newly obtained in the manner described above, the subject map makes it possible to more reliably detect the subject from the image. In learning using a neural network, as amounts of change of the weight, the difference $\Delta Wan(m)$, the information weight difference $\Delta Wbn$, and the subject weight difference $\Delta Wc$ are obtained, and each weight is updated.

Meanwhile, learning using a neural network has been described in detail in, for example, "'Patten Classification' written by Richar O. Duda, Peter E. Hart, David G. Stork, WILEY-INTERSCIENCE ISBN 0-471-05669-3".

The above-described series of information processes can be performed by hardware or software. In a case where the series of processes is to be performed by software, a program forming the software is installed from a recording medium into a computer built in dedicated hardware or, for example, a general-purpose personal computer capable of performing various functions by installing various programs thereon.

Figure 19:
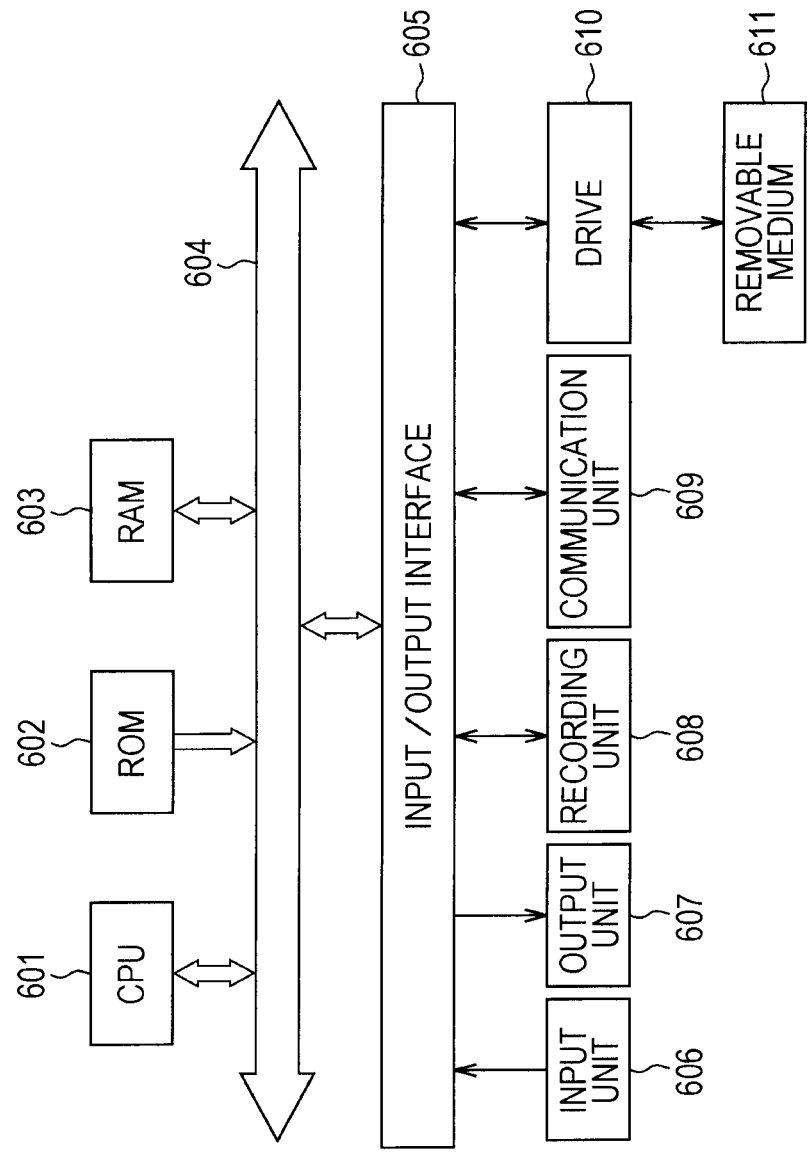
FIG. 19 illustrates an example of the configuration of a computer.

FIG. 19 is a block diagram illustrating an example of the configuration of a computer that performs the above-mentioned series of processes in accordance with programs.

In the computer, a CPU (Central Processing Unit) 601, a ROM (Read Only Memory) 602, and a RAM (Random Access Memory) 603 are interconnected with one another through a bus 604.

Furthermore, an input/output interface 605 is connected to the bus 604. An input unit 606 including a keyboard, a mouse, a microphone, and the like, an output unit 607 including a display, a speaker, and the like, a recording unit 608 including a hard disk, a non-volatile memory, and the like, a communication unit 609 including a network interface, and the like, and a drive 610 for driving a removable medium 611, such as a magnetic disc, an optical disc, a magneto-optical disc, or a semiconductor memory, are connected to the input/output interface 605.

In the computer configured as described above, the CPU 601 loads, for example, a program recorded in the recording unit 608 into the RAM 603 through the input/output interface 605 and the bus 604 and executes the program, thereby performing the above-mentioned series of processes.

The program executed by the computer (the CPU 601) is provided by, for example, recording it on the removable medium 611, such as a magnetic disk (including a flexible disk), an optical disc (including a CD-ROM (Compact Disc Read Only Memory), a DVD (Digital Versatile Disc) or the like), a magneto-optical disc, a semiconductor memory, or the like, serving as a packaged medium. Alternatively, the program may be provided via a wired or wireless transmission medium, such as a local area network, the Internet, or digital satellite broadcasting.

Then, the program can be installed into the recording unit 608 via the input/output interface 605 by mounting the removable medium 611 onto the drive 610. Alternatively, the program can be received at the communication unit 609 via a wired or wireless transmission medium and installed into the recording unit 608. Alternatively, the program can be installed in advance in the ROM 602 or the recording unit 608.

The program executed by the computer may be a program with which the processes are performed in a time-sequential manner in accordance with the order described in the specification, or may be a program with which the processes are executed in parallel or at necessary times, such as when called.

The embodiments of the present invention are not limited to the foregoing embodiments, and various modifications can be made without departing from the scope and spirit of the present invention.

REFERENCE SIGNS LIST

11 image processing apparatus, 21 luminance information extraction unit, 22 color information extraction unit, 23 edge information extraction unit, 24 face information extraction unit, 25 motion information extraction unit, 26 subject map creation unit, 53 weight addition unit, 54 normalization unit, 85 weight addition unit, 86 weight addition unit, 87 normalization unit, 88 normalization unit, 123 weight addition unit, 124 weight addition unit, 125 weight addition unit, 126 weight addition unit, 127 normalization unit, 128 normalization unit, 129 normalization unit, 130 normalization unit

The invention claimed is:

1. An image processing apparatus comprising:
   extracted information image generation means for generating a plurality of extracted information images having mutually different resolutions on the basis of the extracted information images made up of predetermined information extracted from respective areas of an input image;
   difference image generation means for generating a difference image by obtaining a difference between two predetermined extracted information images among the plurality of the extracted information images;
   information map creation means for creating an information map indicating feature quantities of features possessed by an area of a subject in the input image by performing weight addition of the plurality of difference images;
   normalization means for normalizing the information map by subtracting an average value of values of the respective areas of the information map from the value of each area of the information map;
   subject map creation means for creating a subject map indicating the likelihood of an area being a subject in each area of the input image by performing weight addition of the plurality of normalized information maps; and
   edge image generation means for generating, as the extracted information images, images representing edge strengths of the respective areas of the input image by performing weight addition of pixel values of several pixels of the input image by using a pre-specified coefficient, wherein the edge image generation means further comprises:
   a first filter configured to perform a filtering operation on nine pixels arranged consecutively in an x-direction by multiplying the pixels by the coefficients $-1, -2, -1, 2, 4, 2, -1, -2$, and $-1$, respectively, and dividing the sum by 16;
   a second filter configured to perform a filtering operation on eight pixels arranged consecutively in the x-direction by multiplying the pixels by the coefficients $1, 3, 3, 1, 1, 3, 3$, and $1$, respectively, and dividing the sum by 16;
   a third filter configured to perform a filtering operation on nine pixels arranged in a three-by-three matrix by multiplying the pixels by the coefficients $0, 1, 2, -1, 0, 1, -2, -1$, and $0$, respectively, and dividing the sum by 8; and
   a fourth filter configured to perform a filtering operation on nine pixels arranged in a three-by-three matrix by multiplying the pixels by the coefficients $2, 1, 0, 1, 0, -1, 0, -1$, and $-2$, respectively, and dividing the sum by 8.

2. The image processing apparatus according to claim 1, wherein the extracted information image generation means generates the plurality of extracted information images having mutually different resolutions by setting an average value of pixel values of pixels that are adjacent to each other in the extracted information image as a pixel value of a pixel of another extracted information image differing from the extracted information image.

3. The image processing apparatus according to claim 1, wherein the input image is an image composed of luminance components and color-difference components, and
   wherein the extracted information images are images composed of luminance components or color-difference components of the input image as the predetermined information.

4. An image processing method comprising the steps of:
   generating a plurality of extracted information images having mutually different resolutions on the basis of extracted information images made up of predetermined information extracted from respective areas of an input image;
   generating a difference image by obtaining a difference between two predetermined extracted information images among the plurality of the extracted information images;
   creating an information map indicating feature quantities of features possessed by a subject in the input image by performing weight addition of the plurality of difference images;
   normalizing the information map by subtracting an average value of values of the respective areas of the information map from the value of each area of the information map;
   creating a subject map indicating the likelihood of an area being a subject for each area of the input image by performing weight addition of the plurality of normalized information maps;
   and
   generating, as the extracted information images, images representing edge strengths of the respective areas of the input image by performing weight addition of pixel values of several pixels of the input image by using a pre-specified coefficient,
   wherein said generating further comprises:
   applying a first filter configured to perform a filtering operation on nine pixels arranged consecutively in an x-direction by multiplying the pixels by the coefficients $-1, -2, -1, 2, 4, 2, -1, -2$, and $-1$, respectively, and dividing the sum by 16;
   applying a second filter configured to perform a filtering operation on eight pixels arranged consecutively in the x-direction by multiplying the pixels by the coefficients $1, 3, 3, 1, 1, 3, 3$, and $1$, respectively, and dividing the sum by 16;
   applying a third filter configured to perform a filtering operation on nine pixels arranged in a three-by-three matrix by multiplying the pixels by the coefficients $0, 1, 2, -1, 0, 1, -2, -1$, and $0$, respectively, and dividing the sum by 8; and
   applying a fourth filter configured to perform a filtering operation on nine pixels arranged in a three-by-three matrix by multiplying the pixels by the coefficients $2, 1, 0, 1, 0, -1, 0, -1$, and $-2$, respectively, and dividing the sum by 8.

5. A non-transitory, computer-readable medium comprising instructions for causing a computer to perform processing comprising the steps of:
   generating a plurality of extracted information images having mutually different resolutions on the basis of extracted information images made up of predetermined information extracted from respective areas of an input image;

generating a difference image by obtaining a difference between two predetermined extracted information images among the plurality of the extracted information images;

creating an information map indicating feature quantities of features possessed by a subject in the input image by performing weight addition of the plurality of difference images;

normalizing the information map by subtracting an average value of values of the respective areas of the information map from the value of each area of the information map;

creating a subject map indicating the likelihood of an area being a subject for each area of the input image by performing weight addition of the plurality of normalized information maps; and generating, as the extracted information images, images representing edge strengths of the respective areas of the input image by performing weight addition of pixel values of several pixels of the input image by using a pre-specified coefficient, wherein said generating further comprises:

applying a first filter configured to perform a filtering operation on nine pixels arranged consecutively in an x-direction by multiplying the pixels by the coefficients −1, −2, −1, 2, 4, 2, −1, −2, and −1, respectively, and dividing the sum by 16;

applying a second filter configured to perform a filtering operation on eight pixels arranged consecutively in the x-direction by multiplying the pixels by the coefficients 1, 3, 3, 1, 1, 3, 3, and 1, respectively, and dividing the sum by 16;

applying a third filter configured to perform a filtering operation on nine pixels arranged in a three-by-three matrix by multiplying the pixels by the coefficients 0, 1, 2, −1, 0, 1, −2, −1, and 0, respectively, and dividing the sum by 8; and applying a fourth filter configured to perform a filtering operation on nine pixels arranged in a three-by-three matrix by multiplying the pixels by the coefficients 2, 1, 0, 1, 0, −1, 0, −1, and −2, respectively, and dividing the sum by 8.

\* \* \* \* \*